United States Patent
Durr et al.

(10) Patent No.: US 12,187,458 B2
(45) Date of Patent: Jan. 7, 2025

(54) FUEL TANK TESTING SYSTEM

(71) Applicant: The Boeing Company, Chicago, IL (US)

(72) Inventors: Bryan R. Durr, Bothell, WA (US); Timothy Edward Jackson, Mukilteo, WA (US); Eric Scott Gubler, Arlington, WA (US)

(73) Assignee: The Boeing Company, Chicago, IL (US)

( * ) Notice: Subject to any disclaimer, the term of this patent is extended or adjusted under 35 U.S.C. 154(b) by 1499 days.

(21) Appl. No.: 16/184,326

(22) Filed: Nov. 8, 2018

(65) Prior Publication Data

US 2020/0148392 A1 May 14, 2020

(51) Int. Cl.
*B64F 5/60* (2017.01)
*B64D 37/00* (2006.01)
*B64D 37/06* (2006.01)
*G01M 11/00* (2006.01)

(52) U.S. Cl.
CPC .............. *B64F 5/60* (2017.01); *B64D 37/005* (2013.01); *B64D 37/06* (2013.01); *G01M 11/33* (2013.01)

(58) Field of Classification Search
CPC ......... B64F 5/60; B64D 37/005; B64D 37/06; G01M 11/33
USPC ....................................................... 702/108
See application file for complete search history.

(56) References Cited

U.S. PATENT DOCUMENTS

| | | | |
|---|---|---|---|
| 9,234,740 B1 | 1/2016 | Safai et al. | |
| 2003/0056578 A1* | 3/2003 | Mitchell | F02C 9/26 73/112.01 |
| 2004/0162651 A1 | 8/2004 | Halm et al. | |
| 2008/0316007 A1* | 12/2008 | Brinton | G06Q 10/06 340/425.5 |
| 2013/0333472 A1 | 12/2013 | Georgeson et al. | |

(Continued)

FOREIGN PATENT DOCUMENTS

| | | |
|---|---|---|
| JP | 2006177705 A | 7/2006 |
| JP | 2018507418 A | 3/2018 |

OTHER PUBLICATIONS

European Patent Office Examination Report, dated Apr. 16, 2021, regarding Application No. EP19204674.6, 6 pages.

(Continued)

*Primary Examiner* — John H Le

(74) *Attorney, Agent, or Firm* — Yee & Associates, P.C.

(57) ABSTRACT

A method, apparatus, and system for testing a fuel tank for an aircraft. Electrical power is sent to an optical data concentrator for the fuel tank for the aircraft from a power supply such that the optical data concentrator sends optical signals to optical sensors inside the fuel tank through optical fibers connecting the optical data concentrator to the optical sensors. The electrical power is sent during a phase of manufacturing of the aircraft. Test data is received from the optical data concentrator by a computer system. The test data is based on optical response signals received from the optical sensors. A determination of states for the optical sensors is made by the computer system using the test data. A graphical indication of the states determined for the optical sensors inside the fuel tank is displayed by the computer system in a graphical user interface on a display system.

20 Claims, 18 Drawing Sheets

(56) References Cited

U.S. PATENT DOCUMENTS

| | | | |
|---|---|---|---|
| 2014/0104079 A1* | 4/2014 | Bommer | G01F 23/804 |
| | | | 340/945 |
| 2015/0022376 A1* | 1/2015 | Zhang | H04Q 9/00 |
| | | | 340/870.37 |
| 2015/0177132 A1* | 6/2015 | Pechstedt | G01N 33/0004 |
| | | | 356/517 |
| 2015/0254919 A1* | 9/2015 | Cok | G07D 7/128 |
| | | | 356/388 |
| 2018/0031488 A1 | 2/2018 | Waldie | |

OTHER PUBLICATIONS

Extended European Search Report, dated Apr. 14, 2020, regarding Application No. 19204674.6, 9 pages.

Japan Patent Office Notice of Reasons for Rejection and English Translation, dated May 22, 2023, regarding Application No. JP2019-190261, 6 pages.

\* cited by examiner

FIG. 11

FQIS Fiber Test - Right Tank

1100

Summary

| | CH A | CH B |
|---|---|---|
| RM1 (OCP) | PASS | PASS |
| RM2 (OCP) | PASS | PASS |
| RM3 (OSCP) | PASS | PASS |
| RM4 (OCP) | PASS | PASS |
| RM5 (OCP) | PASS | PASS |

| | CH A | CH B |
|---|---|---|
| RM6 (OCP) | PASS | PASS |
| RM7 (OCP) | PASS | PASS |
| RM8 (OCP) | PASS | PASS |
| RM9 (OSCP) | PASS | PASS |
| RM10 (OCP) | PASS | PASS |

| | CH A | CH B |
|---|---|---|
| RM11 (OCP) | PASS | PASS |
| RM12 (OCP) | PASS | PASS |
| RM13 (OSCP) | PASS | PASS |
| RM14 (OCP) | PASS | PASS |
| RM_J (OFCS) | PASS | PASS |

Save

FUEL TANK TESTING SYSTEM

BACKGROUND INFORMATION

1. Field

The present disclosure relates generally to aircraft and in particular, to manufacturing aircraft. Still more particularly, the present disclosure relates to a method, apparatus, and system for testing optical sensors inside a fuel tank system.

2. Background

Commercial passenger aircraft often include fuel tanks in the wings and fuselage. One type of fuel tank is wing that is used as a fuel tank. This type of fuel tank referred to as a wet wing and is an integral part of the wing structure rather than using a bladder or some separate structure. These types of fuel tanks use access panels to provide access to the interior of the fuel tanks for routine maintenance and visual inspections.

In manufacturing an aircraft with fuel tanks integrated into the wings, the wings are manufactured with cavities forming the fuel tanks. Currently, the electrical capacitive sensors are used as fuel tank sensors in the fuel tanks to provide data used in determining the quantity of fuel in the fuel tanks. These fuel tank sensors are tested after the avionics are installed in the aircraft and connected to the fuel tank sensors.

If a nonconformance is identified in the fuel tank sensors, time and effort is needed to access different components of the fuel tank system. For example, the seals for access panels are removed and the access panels are removed to access the fuel sensors within the wing structure. After any operations are performed to resolve nonconformances within the fuel tanks, new seals are installed when replacing the access panels and testing is performed to ensure leaks are absent.

The time and effort needed to inspect, troubleshoot, and repair the nonconformances in a fuel tank at the phase of manufacturing when the wings are connected to the fuselage and avionics is greater than desired. This situation also results in a disruption in manufacturing flow for the aircraft.

Therefore, it would be desirable to have a method and apparatus that take into account at least some of the issues discussed above, as well as other possible issues. For example, it would be desirable to have a method and apparatus that overcome a technical problem with reducing the time and effort in testing fuel tank systems to determine whether nonconformances are present in optical sensors inside fuel tanks in the fuel tank systems.

SUMMARY

An embodiment of the present disclosure provides a method for testing a fuel tank for an aircraft at a phase of manufacturing. Electrical power is sent to an optical data concentrator for the fuel tank for the aircraft from a power supply such that the optical data concentrator sends optical signals to optical sensors in the fuel tank through optical fibers connecting the optical data concentrator to the optical sensors inside the fuel tank. The electrical power is sent during the phase of manufacturing of the aircraft. A computer system in communication with the optical data concentrator receives test data from the optical data concentrator. The test data is based on optical response signals received from the optical sensors. States for the optical sensors are determined by the computer system using the test data. A fuel tank system map of sensor locations showing the states determined for the optical sensors in the fuel tank is displayed by the computer system in a graphical user interface on a display system.

Another embodiment of the present disclosure provides a method for testing a fuel tank for an aircraft. Electrical power is sent to an optical data concentrator for the fuel tank for the aircraft from a power supply such that the optical data concentrator sends optical signals to optical sensors inside the fuel tank through optical fibers connecting the optical data concentrator to the optical sensors. The electrical power is sent during a phase of manufacturing of the aircraft. Test data is received from the optical data concentrator by a computer system in communication with the optical data concentrator. The test data is based on optical response signals received from the optical sensors. A determination of states for the optical sensors is made by the computer system using the test data. A graphical indication of the states determined for the optical sensors inside the fuel tank is displayed by the computer system in a graphical user interface on a display system.

Yet another embodiment of the present disclosure provides a fuel tank system analyzer comprising a power supply and a computer system. The power supply operates to send electrical power to an optical data concentrator for a fuel tank in a fuel tank system for an aircraft from a power supply such that the optical data concentrator sends optical signals to optical sensors inside the fuel tank through optical fibers connecting the optical data concentrator to the optical sensors. The computer system operates to receive test data from the optical data concentrator when the computer system is in communication with the optical data concentrator in which the test data is based on optical response signals received from the optical sensors. The computer system operates to determine states for the optical sensors using the test data. The computer system operates to display a graphical indication of the states determined for the optical sensors in the fuel tank in a graphical user interface on a display system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 11 is an illustration of a test summary page in accordance with an illustrative embodiment;

DETAILED DESCRIPTION

The illustrative embodiments recognize and take into account one or more different considerations. For example, the illustrative embodiments recognize and take into account that it would be desirable to test components in a fuel tank system, the completed wing assembly being assembled with other components to form completed aircraft.

The illustrative embodiments recognize and take into account that with the use of optical components within the cavities of the fuel tank structures, testing of fuel tanks can be performed at an earlier stage as compared to currently used electrically based sensors inside fuel tanks that use wired connections. The illustrative embodiments recognize and take into account that these components include, for example, optical fuel tank sensors, fiber-optic bundles, and other components.

The illustrative embodiments recognize and take into account that currently after integration of the fuel tank sensors, fiber-optic bundles, and other components, a mechanism for verifying the operation of sensors and sensor connections is unavailable without assembling the entire aircraft and initiating a full up system test.

The illustrative embodiments recognize and take account, however, that with an optical based sensor system, optical data concentrators can be connected to the optical sensors in the fuel tanks using optical fibers. The optical data concentrators can receive optical signals from the optical sensors.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Thus, the illustrative embodiments provide a method, apparatus, and system for testing a fuel tank system.

Figure 1:
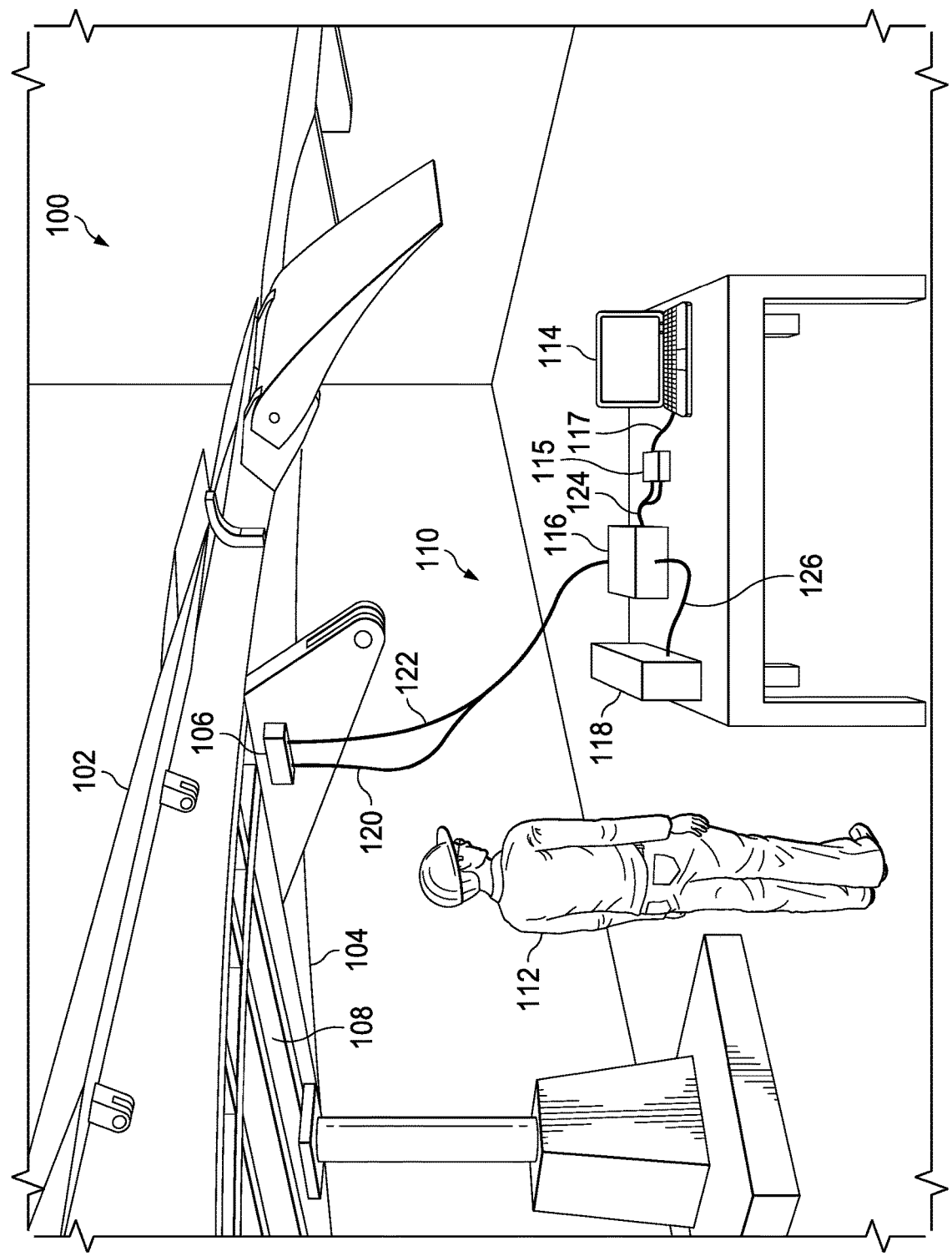
FIG. 1 is a pictorial illustration of a fuel tank system testing environment in accordance with an illustrative embodiment.

With reference now to the figures and in particular with reference to FIG. 1, a pictorial illustration of a fuel tank system testing environment is depicted in accordance with an illustrative embodiment. In this illustration, fuel tank system testing environment 100 includes wing 102, which is a wet wing. In which the structure of wing 102 defines a cavity for fuel tank 104 within wing 102. As depicted, wing 102 in a phase of manufacturing in which various components have been installed for fuel tank 104. In this illustrative example, components such as optical sensors and optical fibers have been installed inside fuel tank 104. As depicted, optical fuel quantity data concentrator 106 is located outside of the fuel tank 104.

At this phase of manufacturing, wing 102 has not yet been attached to other components such as a fuselage of the aircraft. Additionally, seals and other parts that reduce access to components within fuel tank 104 and not yet been installed in this phase of manufacturing of the aircraft.

Testing of these components for fuel tank 104 can be performed even though optical fuel quantity data concentrator 106 has not yet been connected to the assembled avionics of aircraft. Further this testing can occur before seals and other parts limiting access to interior 108 of fuel tank 104 are installed.

In this example, the testing can be performed using fuel tank system analyzer 110 operated by human operator 112. Fuel tank system analyzer 110 comprises laptop computer 114, network interface 115, power supply 118, and controller 116.

As depicted, laptop computer 114 is connected to network interface 115 by universal serial bus cable 117. In turn, network interface 115 is connected to controller 116 by cable 124, which is a Y-cable in this example. As depicted, one end of cable 124 connects to controller 116 and the split ends both connect to network interface 115. Power supply 118 is connected to controller 116 by cable 126. Controller 116 is connected to optical fuel quantity data concentrator 106 by test cable Channel A 120 and test cable Channel B 122. These two cables form a Y-cable that connects optical fuel quantity data concentrator 106 to controller 116.

Power supply 118 sends electrical power in the form of an electrical current though cable 126 to controller 116. Controller 116 then routes power to optical fuel quantity data concentrator 106 through test cable channel A 120 or test cable Channel B 122. When the electrical current is received by optical fuel quantity data concentrator 106, optical fuel quantity data concentrator 106 sends an optical signal to optical fuel sensors that are connected to optical fuel quantity data concentrator 106 by optical fibers.

The optical signal sent by optical fuel quantity data concentrator 106 is converted into electrical power by photovoltaic converters located within each optical fuel sensor. The converted electrical power is used to power the sensors. In this illustrative example, powered fuel sensors will automatically start producing data readings and will convert the raw sensor data back into an optical signal and transmit it back to optical fuel quantity data concentrator 106 via the same optical link used to power the sensor.

The electrical current from power supply 118 is routed through either test cable Channel A 120 or test cable Channel B 122 when a switch in controller 116 is closed to allow the electrical current to flow from controller 116 to optical fuel quantity data concentrator 106. The switch can be, for example, a manual switch operated by human operator 112 or an electronic switch controlled by laptop computer 114.

In response a set of the optical sensors send a set of optical response signals to optical fuel quantity data concentrator 106. As used herein, a "set of," when used with respect to items, mean zero or more items. For example, a set of optical sensors is zero or more sensors. In other words, the set can be a null set in which none of the optical sensors return optical response signals.

Optical fuel quantity data concentrator 106 generates test data in response to receiving the set of optical response signals. This test data is sent to laptop computer 114 through test cable Channel A 120 or test cable Channel B 122 to controller 116 and then to laptop computer 114 for analysis. Laptop computer 114 determines the state of the optical sensors based on the test data.

Figure 2:
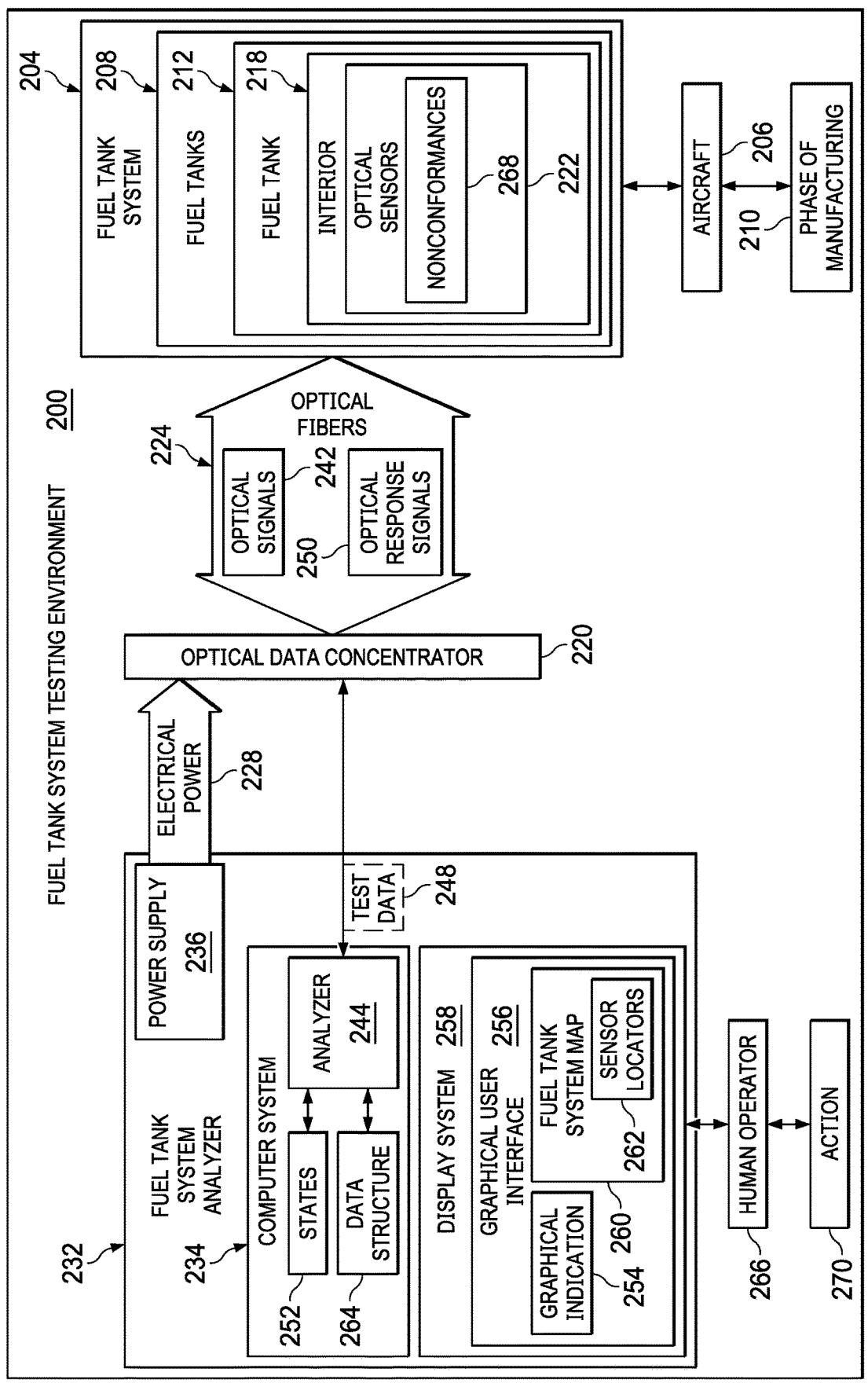
FIG. 2 is an illustration of a block diagram of a fuel tank system testing environment in accordance with an illustrative embodiment.

With reference to FIG. 2, an illustration of a block diagram of a fuel tank system testing environment is depicted in accordance with an illustrative embodiment. Fuel tank system testing environment 100 is an example of one implementation of fuel tank system testing environment 200 in FIG. 2.

In this illustrative example, fuel tank system 204 for aircraft 206 comprises fuel tanks 208. As depicted, aircraft 206 is a partially assembled aircraft. Fuel tanks 208 can be selected from at least one of a wing for aircraft 206, a fuselage section for aircraft 206, or some other suitable component that is assembled with other components to form aircraft 206.

In phase of manufacturing 210 for aircraft 206, fuel tank 212 in fuel tanks 208 is a physical structure in which fuel is carried in interior 218 of the fuel tank 212.

In this example, optical data concentrator 220 is located outside of fuel tank 212 and optical sensors 222 are located in interior 218 of fuel tank 212 for fuel tank system 204. Optical data concentrator 220 and optical sensors 222 are connected to each other by optical fibers 224. These optical fibers can be bundled in a harness.

In the illustrative example, optical sensors 222 can detect a number of different parameters for fuel tank 212. For example, optical sensors 222 can detect at least one of temperature, capacitance, fuel density, fuel level, or other suitable parameters.

In this illustrative example, aircraft 206 is in phase of manufacturing 210 in which aircraft 206 can be a partially assembled aircraft. Components for fuel tank system 204 may not be fully assembled and connected to other portions of aircraft 206. For example, fuel tank system 204 may not be connected to avionics for aircraft 206.

As depicted, fuel tank system analyzer 232 enables testing fuel tank system 204 prior to fuel tank system 204 being connected to the avionics for aircraft 206. For example, fuel tank system analyzer 232 can operate to test optical sensors 222 in interior 218 of fuel tank 212 prior to optical data concentrator 220 being connected to the avionics for aircraft 206.

This illustrative example, fuel tank system analyzer 232 comprises a number of different components. As depicted, fuel tank system analyzer 232 comprises computer system 234 and power supply 236.

Computer system 234 is a physical hardware system and includes one or more data processing systems. When more than one data processing system is present in computer system 234, those data processing systems are in communication with each other using a communications medium. The communications medium can be a network. The data processing systems can be selected from at least one of a computer, a server computer, desktop computer, a tablet computer, a mobile phone, smart glasses, or some other suitable data processing system.

In this illustrative example, power supply 236 can take a number of different forms. Power supply 236 can be one or more electrical devices that supply electrical power 228 to an electrical load. In this illustrative example, electrical load is optical data concentrator 220 and electrical power 228 is delivered in the form of an electric current.

As depicted, power supply 236 can be selected from at least one of a battery, a generator, an uninterruptible power supply, a switch mode power supply, or some other suitable type of power supply. Electrical power 228 can be the form of at least one of alternating current or direct current.

In this illustrative example, power supply 236 is connected to optical data concentrator 220. As depicted, power supply 236 sends electrical power 228 to optical data concentrator 220 for fuel tank 212 for aircraft 206 such that optical data concentrator 220 sends optical signals 242 to optical sensors 222 inside fuel tank 212 through optical fibers 224 connecting optical data concentrator 220 to optical sensors 222. In this illustrative example, electrical power 228 is sent during phase of manufacturing 210 of aircraft 206.

In this illustrative example, computer system 234 is in communication with power supply 236. Analyzer 244 in computer system 234 controls the operation of power supply 236 to electrical power 228 to optical data concentrator 220. In other illustrative examples, human operators or other mechanisms can be used to control sending of electrical power 228 by power supply 236 to optical data concentrator 220.

As depicted, computer system 234 is in communication with optical data concentrator 220. In this illustrative example, the communication between computer system 234 and optical data concentrator 220 can be provided through at least one of a wired connection, and optical connection, or a wireless connection.

In this illustrative example, analyzer 244 in computer system 234 receives test data 248 from optical data concentrator 220. As depicted, test data 248 is based on optical response signals 250 received from optical sensors 222. These optical response signals are generated in response to optical signals being sent by optical data concentrator 220 to optical sensors 222 over optical fibers 224.

As depicted, test data 248 can be sent using a number of different protocols. For example, test data 248 is sent in data packets using data packets sent over network. In one illustrative example, test data 248 is sent using controller area network (CAN) packets. CAN packets are generated based on a vehicle bus standard and is a message based protocol. The International Organization for Standards (ISO) has released the following standards for CAN: ISO 118118-1, ISO 118118-2, and ISO 118118-3. Any standard suitable for transmitting test data 248 from optical data concentrator 220 to analyzer 244 in computer system 234 can be used.

In the illustrative example, test data 248 includes an identification of the optical sensors and the state of the optical sensors. For example, test data 248 can be sent by optical data concentrator 220 using a controller area network bus (CAN) protocol. With this protocol, a message includes an identifier and a corresponding set of data from an optical sensor. A portion of the identifier designates the optical sensor that generated the data in the message.

Analyzer 244 determines states 252 for optical sensors 222 using the test data 248. In the illustrative example, states 252 are selected from at least one of no data, fail, pass, or some other suitable state.

In response to determining states 252, analyzer 244 displays graphical indication 254 of states 252 determined for optical sensors 222 inside fuel tank 212 in graphical user interface 256 on display system 258. Display system 258 is a physical hardware system and includes one or more display devices on which graphical user interface 256 can be displayed. The display devices may include at least one of a light emitting diode (LED) display, a liquid crystal display (LCD), an organic light emitting diode (OLED) display, a computer monitor, a projector, a flat panel display, a heads-up display, or some other suitable device that can output information for the presentation of information. Display system 258 is configured to display graphical user interface 256.

In one illustrative example, displaying of graphical indication 254 by analyzer 244 can include displaying fuel tank system map 260 of sensor locations 262 showing states 252 determined for optical sensors 222 inside fuel tank system in a graphical user interface on a display system.

In other words, the locations of optical sensors are displayed in sensor locations 262 with states 252 to provide a visualization of states 252 of optical sensors 222 inside fuel tank 212. This visualization provides a tool to identify non-conformances 268 that may be present in fuel tank 212.

In one illustrative example, human operator 266 can view states 252 displayed on graphical user interface 256 to determine whether a number of nonconformances 268 are present for optical sensors 222. As used herein, a "number of" when used with reference items means one or more items. For example, a number of nonconformances 268 is one or more of nonconformances 268. The number of nonconformances 268 can be located in at least one of an optical sensor, an optical fiber, a connector, or some other item inside fuel tank 212.

Responsive to a group of optical sensors 222 having a number of nonconformances 268, human operator 266 can perform action 270 to resolve the number of nonconformances 268 in the group of optical sensors 222.

Further, states 252 for optical sensors 222 also can be stored in data structure 264. In this illustrative example, data structure 264 can be selected from a group comprising a database, a linked list, a flat file, a table, or in some other suitable type of data structure.

With storing states 252, historical information can be generated used in analyzing nonconformances for optical sensors inside fuel tank systems. For example, the states can be compared with states determined for optical sensors inside fuel tanks for other aircraft. For example, the comparison of states for optical sensors can be made for left-wing fuel tanks between a group of aircraft. This type of analysis can be used to determine whether changes should be made in the manufacturing process for flow. Further, the analysis can be made to determine whether particular suppliers of optical sensors have more nonconformances than other suppliers.

Analyzer 244 can be implemented in software, hardware, firmware or a combination thereof. When software is used, the operations performed by analyzer 244 can be implemented in program code configured to run on hardware, such as a processor unit. When firmware is used, the operations performed by analyzer 244 can be implemented in program code and data and stored in persistent memory to run on a processor unit. When hardware is employed, the hardware may include circuits that operate to perform the operations in analyzer 244.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In one illustrative example, one or more technical solutions are present that overcome technical problems with reducing the time and effort in testing fuel tank systems to determine whether nonconformances are present in optical sensors inside fuel tanks in the fuel tank systems. As a result, one or more technical solutions may provide a technical effect enabling testing fuel tanks at an earlier phase in manufacturing than currently performed.

Computer system 234 can be configured to perform at least one of the steps, operations, or actions described in the different illustrative examples using software, hardware, firmware or a combination thereof. As a result, computer system 234 operates as a special purpose computer system in which analyzer 244 in computer system 234 enables testing fuel tanks 208. More specifically, analyzer 244 in computer system 234 can operate to determine states 252 of optical sensors 222 when electrical power 228 is sent to optical data concentrated 220. Analyzer 244 can display states 252 using graphical indication 254 which can take the form of fuel tank system map 260 displayed in graphical user interface 256 on display system 258. In particular, analyzer 244 transforms computer system 234 into a special purpose computer system as compared to currently available general computer systems that do not have analyzer 244.

The illustration of fuel tank system testing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, electrical power 228 can be sent directly or indirectly from power supply 236 to optical data concentrator 220. For example, power supply 236 can be connected to optical data concentrator 220 by a switch or controller. As another example, computer system 234 can be connected to optical data concentrator 220 by a switch or controller. In other words, test data 248 can be sent from optical data concentrator 220 to computer system 234 through a switch or controller connecting these two components. In other illustrative examples, these components can be connected directly to each other through cables or wires.

In yet another illustrative example, optical data concentrator 220 and computer system 234 can each include wireless transmission capabilities such as Bluetooth circuits or devices. In yet another illustrative example, optical data concentrator 220 can be located in interior 218 inside of fuel tank 212.

Figure 3:
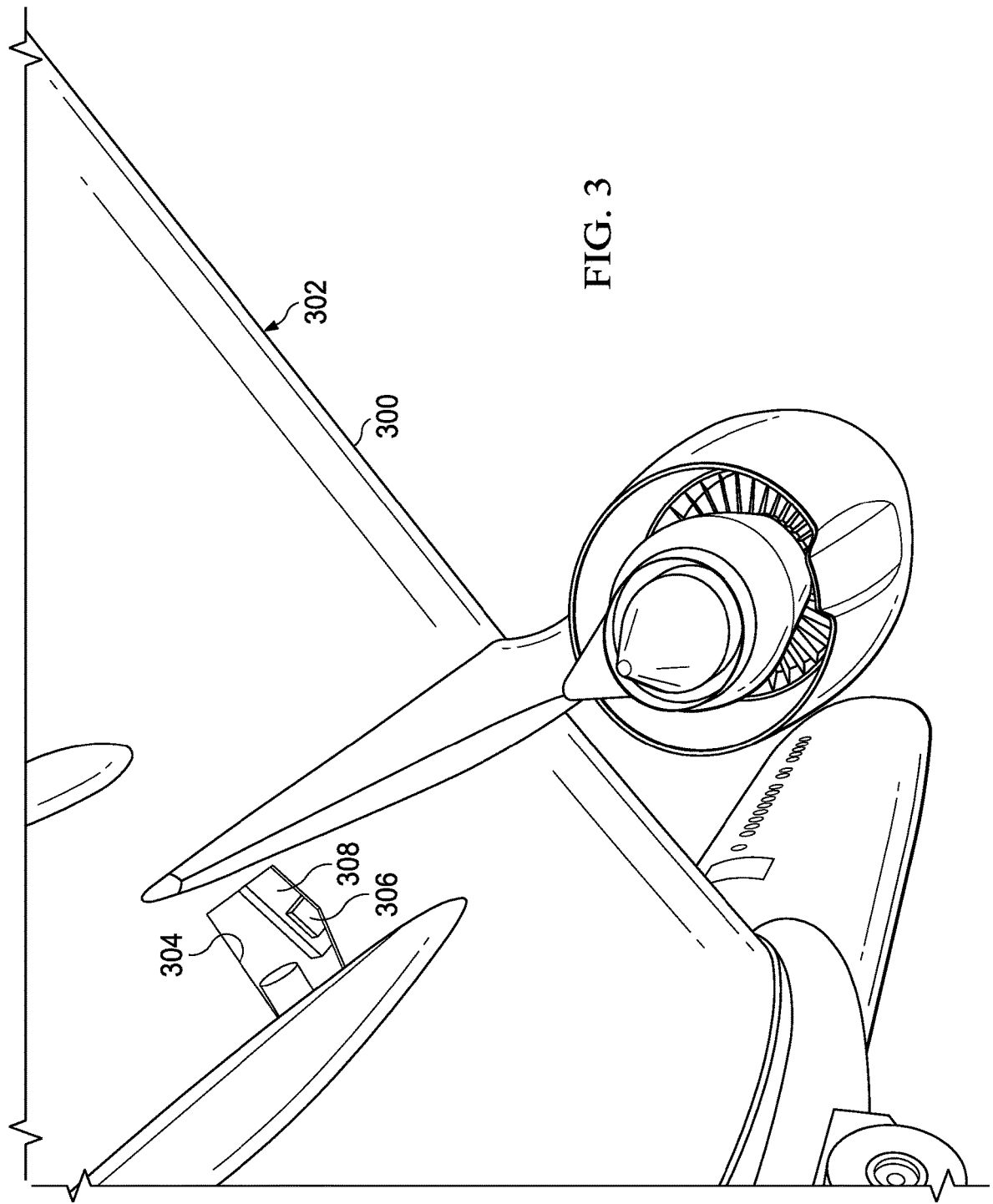
FIG. 3 is an illustration of a wing of an aircraft in accordance with an illustrative embodiment.

With reference to FIG. 3, an illustration of a wing of an aircraft is depicted in accordance with an illustrative embodiment. In this illustrative example, wing 300 for aircraft 302 is depicted. As depicted, access port 304 in wing 300 is shown with the access panel removed. In this view, data concentrator 306 can be seen on the outside of fuel tank 308 in wing 300.

Figure 4:
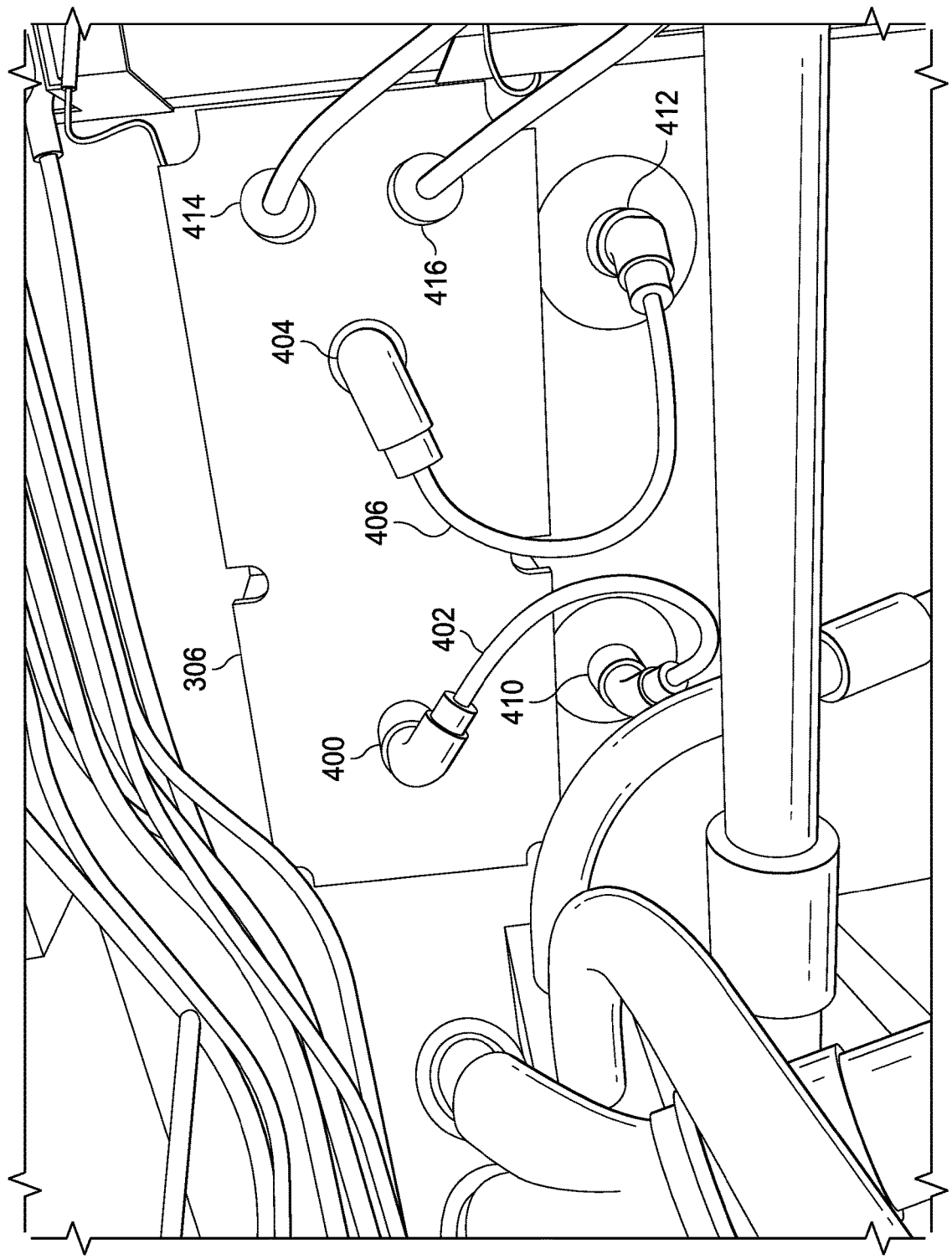
FIG. 4 is an illustration of another view of a data concentrator in accordance with an illustrative embodiment.

Turning next to FIG. 4, an illustration of another view of a data concentrator is depicted in accordance with an illustrative embodiment. In the illustrative examples, the same reference numeral may be used in more than one figure. This reuse of a reference numeral in different figures represents the same element in the different figures.

As depicted, a view of data concentrator 306 for fuel tank 308 from FIG. 3 is shown in this figure. As can be seen in this illustrative example, data concentrator 306 has connector 400 connected optical fiber cable 402 and connector 404 connected to optical fiber cable 406. Optical fiber cable 402 is for Channel A, while optical fiber cable 406 is for Channel B in which the two channels provide redundancy. Optical fiber cable 402 is connected to fuel tank connector 410 and optical fiber cable 406 is connected to fuel tank connector 412. These connectors provide connections to optical fibers inside of fuel tank 308. These optical fibers are connected to optical sensors within fuel tank 308.

In this illustrative example, data concentrator 306 also has connector 414 for Channel A and connector 416 for Channel B. These two connectors can be connected to a fuel tank system analyzer, such as fuel tank system analyzer 232 shown in block form in FIG. 2. These connections can provide for supplying power to data concentrator 306 and receiving data from data concentrator 306.

With reference to FIGS. 5-9 illustrations of a graphical user interface for displaying the status of optical tank sensors in a fuel tank is depicted in accordance with an illustrative embodiment. These figures illustrate interface for performing testing and displaying states of optical sensors using a fuel tank system map.

Figure 5:
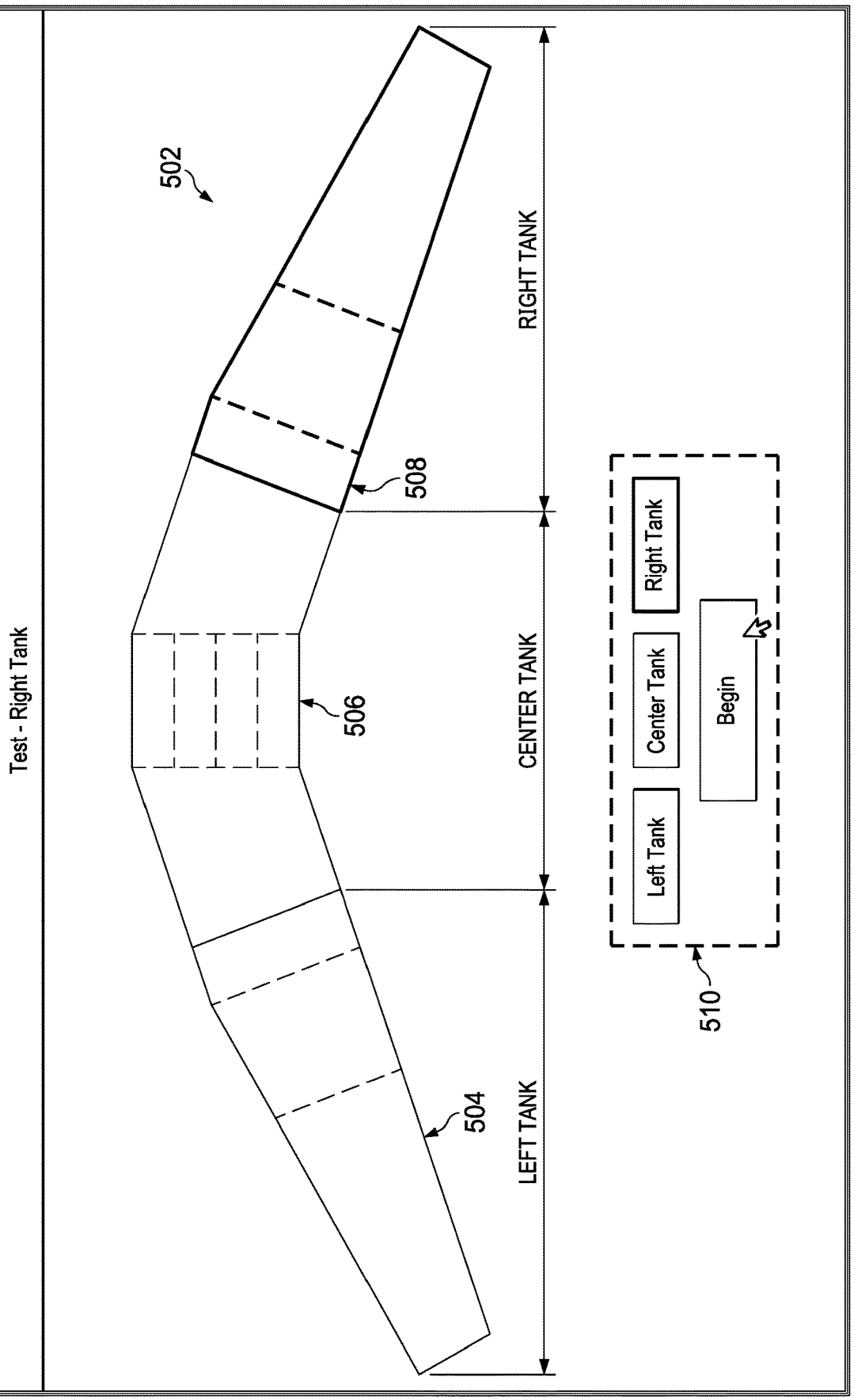
FIG. 5 is an illustration of a graphical user interface for testing a fuel tank in a fuel tank system in accordance with an illustrative embodiment.

With reference first to FIG. 5, an illustration of a graphical user interface for testing a fuel tank in a fuel tank system is depicted in accordance with an illustrative embodiment. In this figure, graphical user interface 500 is an example of one implementation for graphical user interface 256 in FIG. 2. As depicted, fuel tank system map 502 is displayed in graphical user interface 500. In this example, fuel tank system map 502 is for a fuel tank system with fuel tanks that includes left tank 504, center tank 506, and right tank 508.

In this example, controls 510 are used to select a fuel tank for testing and to initiate testing of the selected fuel tank. In this illustrative example, right tank 502 has been selected for testing.

Figure 6:
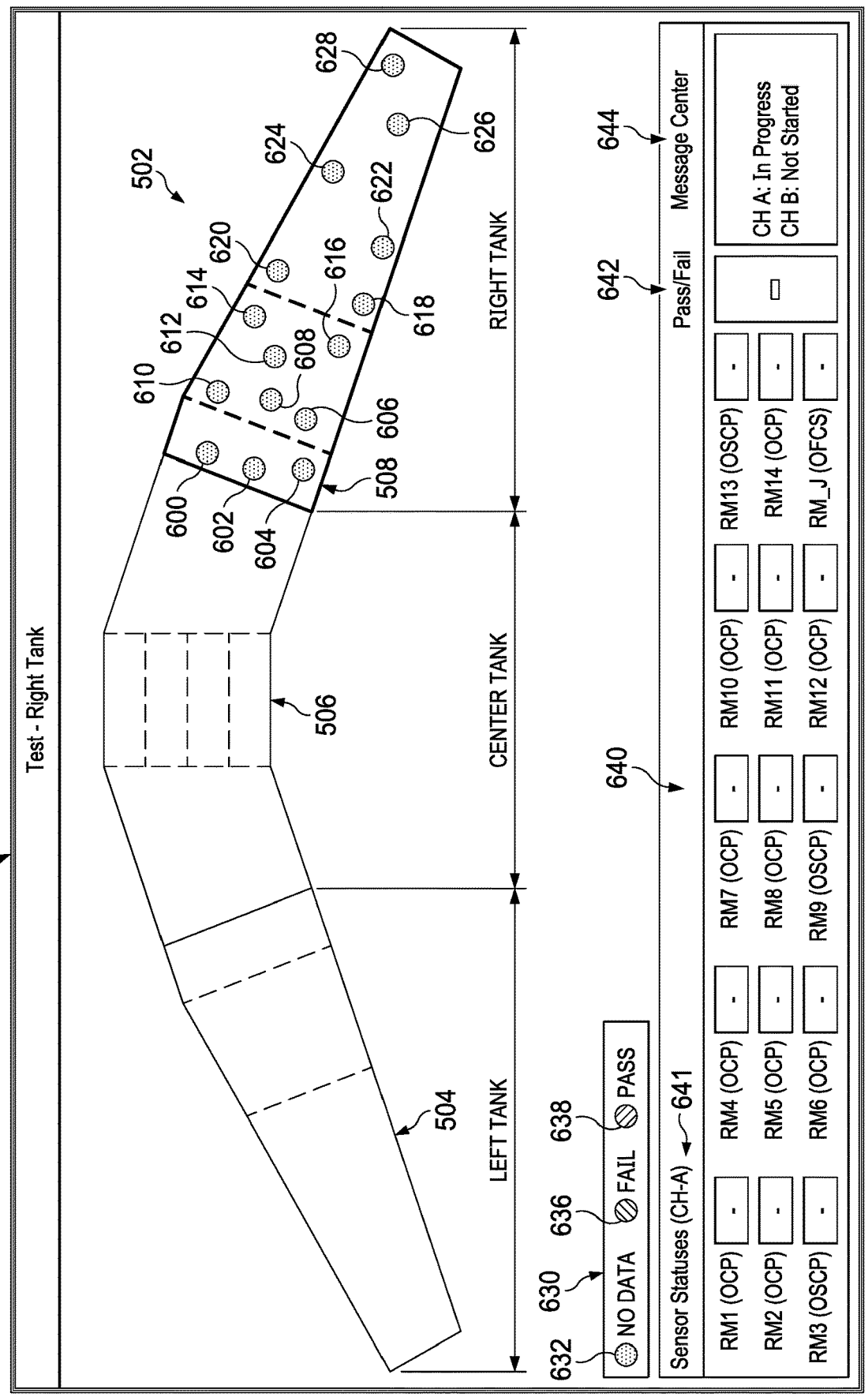
FIG. 6 is an illustration of a graphical user interface showing progress in testing a fuel tank in accordance with an illustrative embodiment.

Turning now to FIG. 6, an illustration of a graphical user interface showing progress in testing a fuel tank is depicted in accordance with an illustrative embodiment. In this figure, sensor locations are displayed on right tank 508. The sensor locations include the sensor location 600, sensor location 602, sensor location 604, sensor location 606, sensor location 608, sensor location 610, sensor location 612, sensor location 614, sensor location 616, sensor location 618, sensor location 620, sensor location 622, sensor location 624, sensor location 626, and sensor location 628. The sensor locations correspond to locations of optical sensors in the right fuel tank. As depicted, the testing can be performed for two channels, Channel A and Channel B. The sensor locations indicate the current channel being tested.

In this illustrative example, two channels are present provide redundancy in case one channel has or develops a nonconformance. In other illustrative examples, other numbers channels can be present such as one, three, or some other number channels.

Additionally, types of sensor status for the optical sensors is displayed in section 630. In this illustrative example, the sensor status includes no data 632, fail 636, and pass 638. In this example, all of the sensor locations show the sensor status of no data 632.

Sensor status display 640 is a section in which the status for the optical sensors is displayed. An overall pass fail for fuel tank is displayed in overall pass/fail display 642. No indication is shown for an overall pass or fail in overall pass/fail display 642 in this figure because testing has not yet been performed or completed. The pass or fail is for the current channel being tested.

Messages are displayed in message center 644. In this example, the messages show that testing has not started since no data has been received from the data concentrator. In this depicted example, the messages are shown for two channels, Channel A and Channel B, in which testing can be performed for the optical sensors.

As can be seen, the status of the optical sensors is shown as no data for right tank 508. In other words, test data has not been received from the optical data concentrator for the optical sensors.

In the illustrative example, information is displayed in graphical user interface 500 for the active channel. For example, an analyzer automatically switches the display of graphical user interface 500 to the active channel when a message is received from a different channel. For example, if a Channel B message was received, message center 644 will display "CH A: Paused", or if testing is complete for Channel A, message center 644 displays "CH A: Pass", or "CH A: Fail". In this instance, message center 644 will display "CH B: In Progress", assuming testing was not completed earlier. In addition, sensor status display 640 will show the sensor status for the active channel. The active channel is indicated in section 641 of sensor status display 640. In this depicted example, section 641 displays "Sensor Statuses (CH-A)" and will display "Sensor Statuses (CH-B)" when a message is received from Channel B. Results for both channels can be seen in a summary page once the test is stopped and the summary page is displayed as depicted in FIG. 11.

Figure 7:
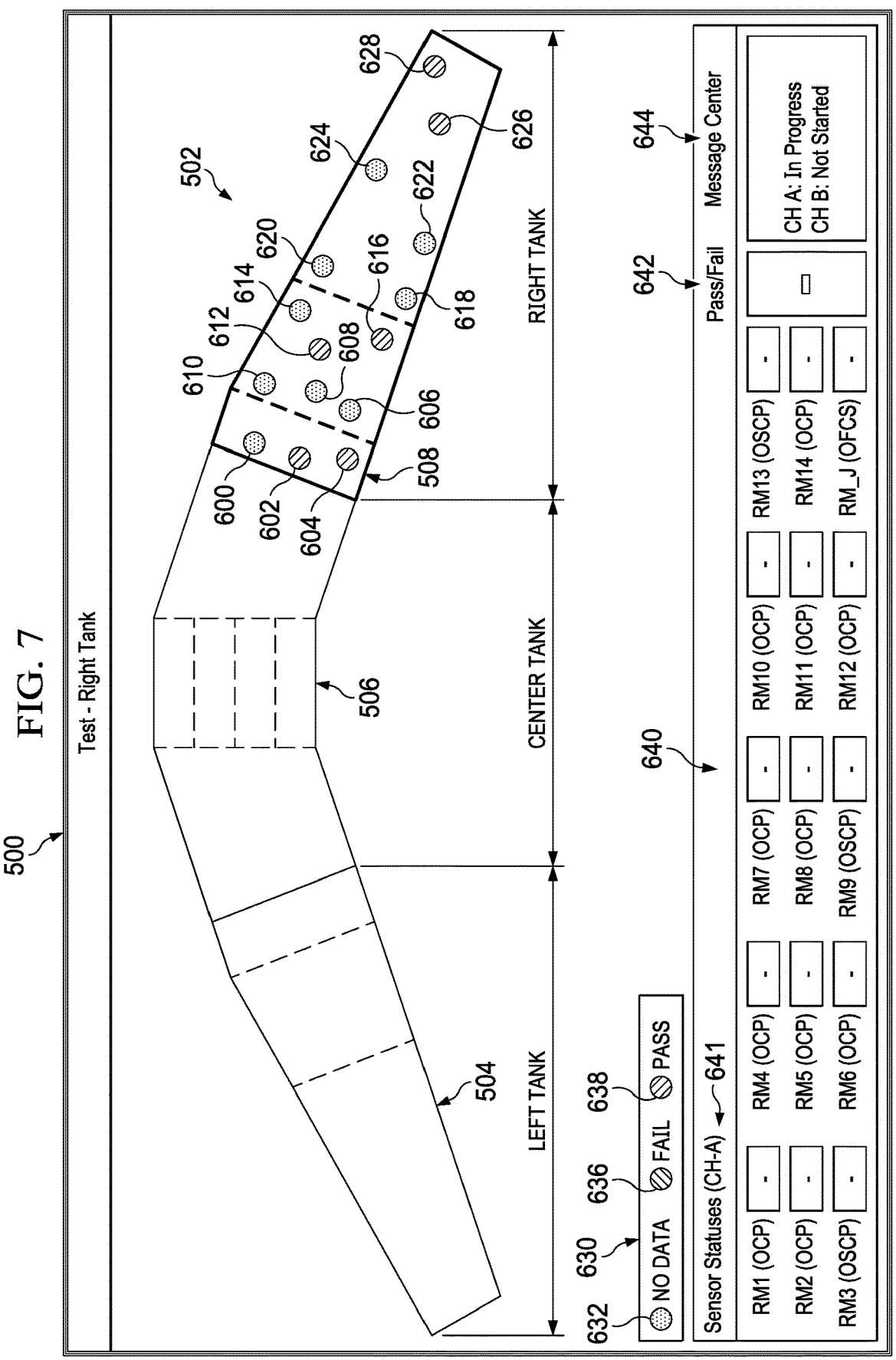
FIG. 7 is an illustration of a graphical user interface showing progress in testing the fuel tank in accordance with an illustrative embodiment.

Turning now to FIG. 7, an illustration of a graphical user interface showing progress in testing the fuel tank is depicted in accordance with an illustrative embodiment. In this figure, as data is received from the data concentrator, the status of the optical sensors changes to indicate whether the optical sensors are in a pass or fail state. In this example, the optical sensors in sensor location 602, sensor location 604, sensor location 612, sensor location 616, sensor location 626, and sensor location 628 are pass. The other sensor locations have not yet responded with sensor data and are displayed as no data.

Overall pass/fail display 642 does not show an overall pass or fail for the tank. Message center 644 shows that testing is in progress for Channel A and no testing has started for Channel B.

Figure 8:
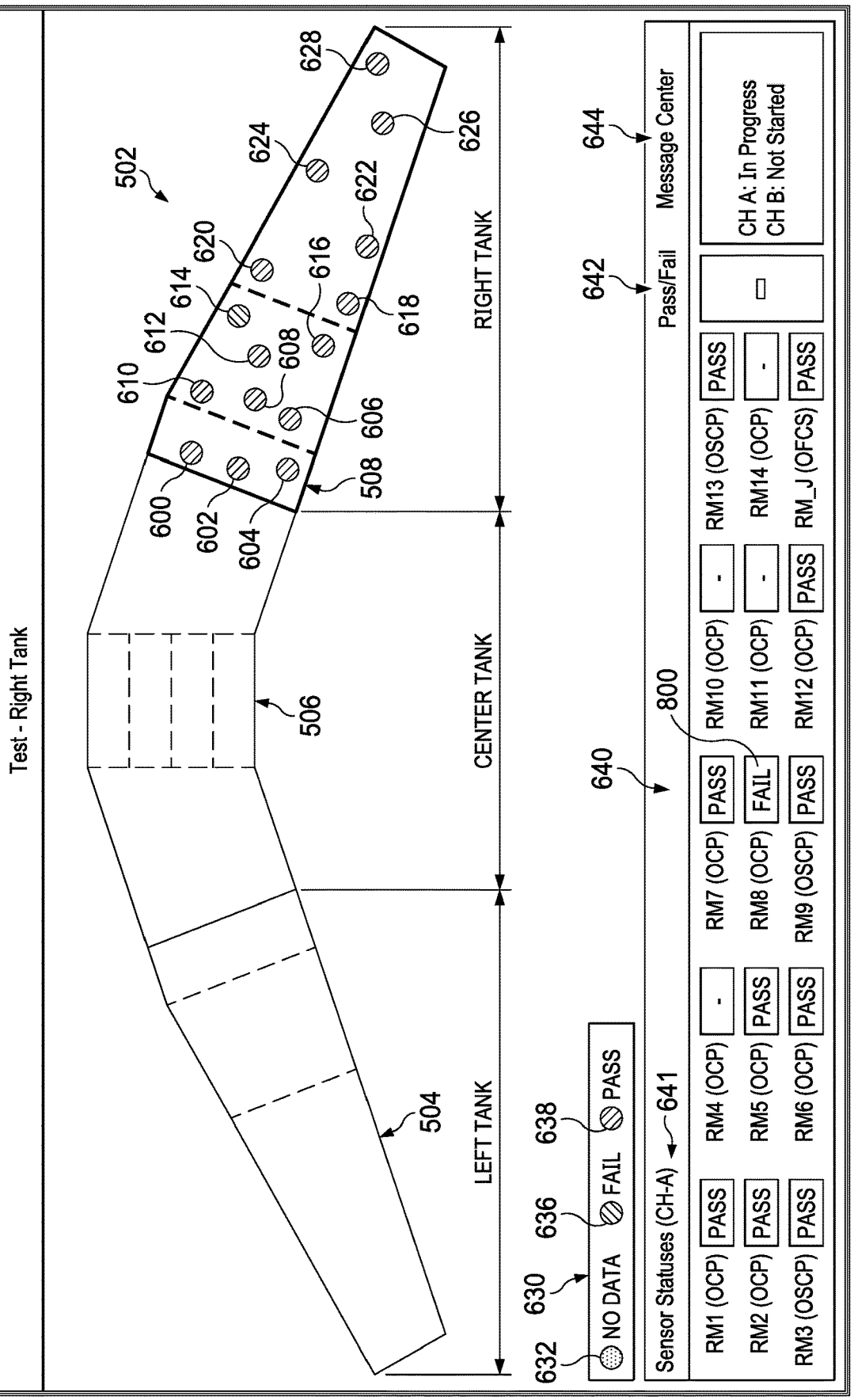
FIG. 8 is an illustration of a graphical user interface showing progress in testing the fuel tank in accordance with an illustrative embodiment.

In FIG. 8, an illustration of a graphical user interface showing progress in testing the fuel tank is depicted in accordance with an illustrative embodiment. In this figure, sensor location 600, sensor location 602, sensor location 604, sensor location 606, sensor location 608, sensor location 612, sensor location 616, sensor location 618, sensor location 624, and sensor location 626 on fuel tank system map 502 graphically indicate a status as pass. This indication is also made in section 640 of graphical user interface 500. In this example, sensor location 610, sensor location 620, sensor location 622, and sensor location 628 are shown as no data. Sensor location 614 is shown as having a fail status. This fail status is also displayed in field RM8 (OCP) 800 in in section 640.

Figure 9:
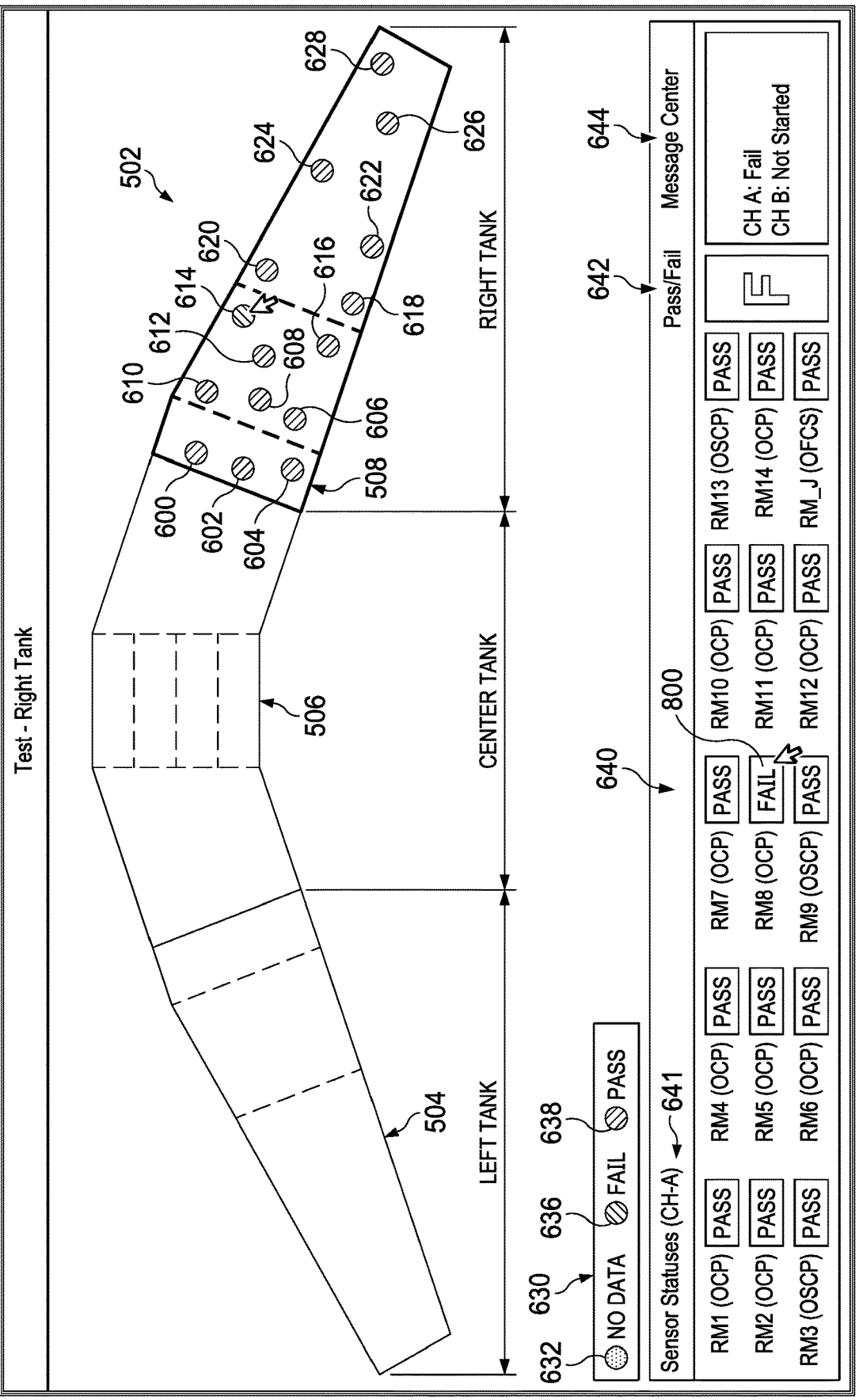
FIG. 9 is an illustration of a graphical user interface showing the status of optical sensors in the fuel tank in accordance with an illustrative embodiment.

Turning to FIG. 9, an illustration of a graphical user interface showing the status of optical sensors in the fuel tank is depicted in accordance with an illustrative embodiment. As the test progresses the sensor locations will show either a pass or fail status. Further, as the test progresses a fail status can change to a pass status or vice versa. In other words, test data can be continually received from the data concentrator over a period of time.

In this figure, all of the optical sensors in the different sensor locations have changed to pass except for sensor location 614. This sensor location continues to have a fail state. In this example, the overall pass/fail for the fuel tank being tested is shown as a fail overall pass/fail display 642. A fail message is also present in message center 644.

Figure 10:
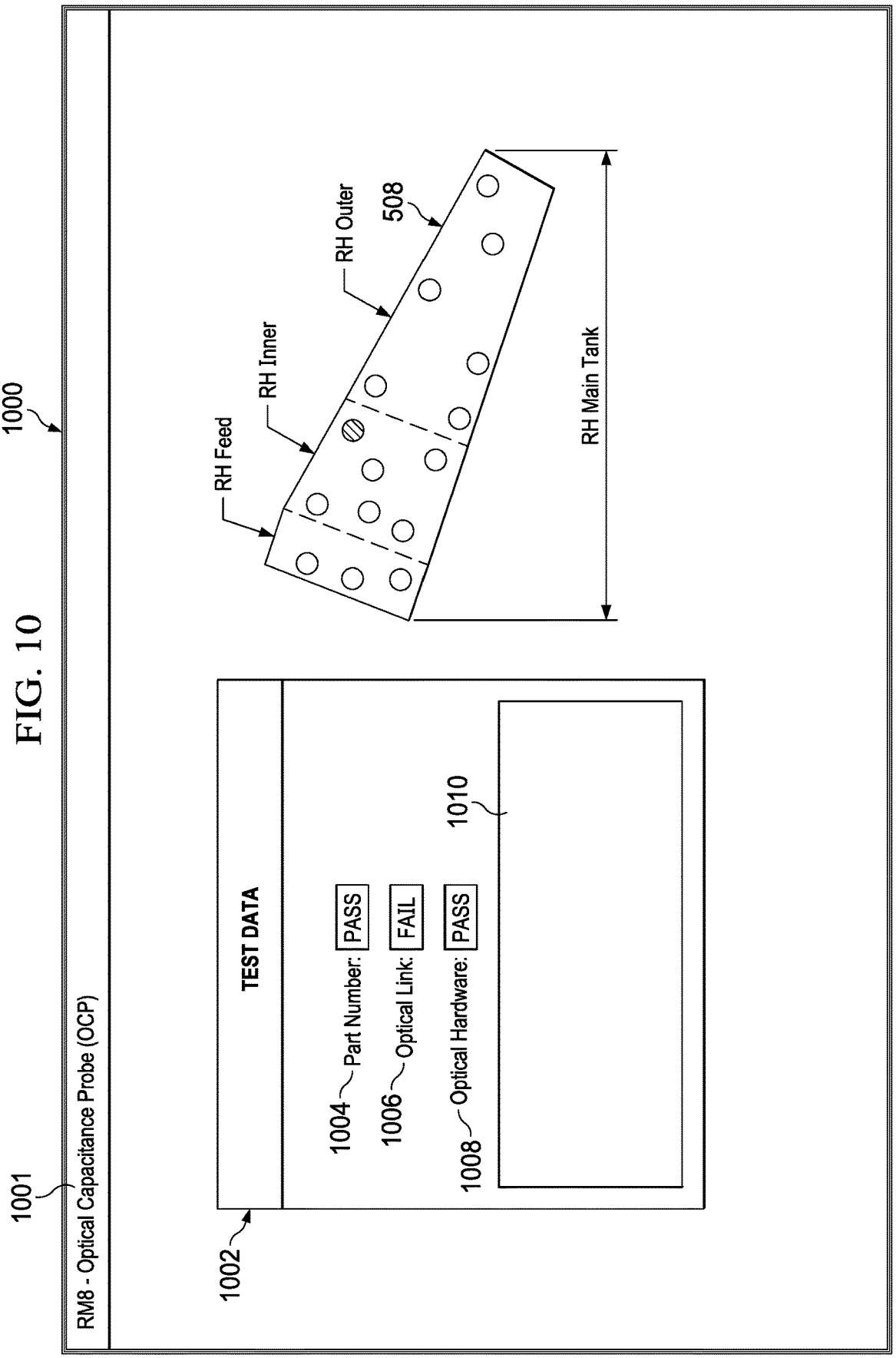
FIG. 10 is an illustration of a sensor detail page in accordance with an illustrative embodiment.

With reference now to FIG. 10, an illustration of a sensor detail page is depicted in accordance with an illustrative embodiment. In this illustrative example, graphical user interface 500 displays sensor detail page 1000. In this example, sensor detail page 1000 is displayed in response to selecting sensor location 612 from the sensor locations on fuel tank system map 502.

As depicted, sensor detail page 1000 shows more detailed information about the optical sensor at sensor location 614. As depicted, taskbar 1001 identifies RM8 (OCP) as the optical sensor that showed fail status in FIG. 9.

In this example, right tank 508 from fuel tank system map 502 is displayed on sensor detail page 1000. This display provides the human operator viewing the graphical user interface to visualize the location of the optical sensor while viewing additional test data. In this example, additional test data is shown in window 1002.

As depicted, window 1002 provides additional information about the testing of the optical sensor. In this example, additional information about state of components shown for part number 1004, optical link 1006, an optical hardware 1008. Part number 1004 indicates whether the part number for the sensor being tested matches the expected part number for this sensor. If a match is present, part number 1004 indicates pass as shown in this example. Optical link 1006 indicates whether the link between the optical sensor and the data concentrator is operating correctly. In this example, optical link 1006 is shown as fail. The optical sensors can include self-diagnostic processes that allow the optical sensor to determine whether a hardware failure has occurred, which is indicated in optical hardware 1008. In this example, optical hardware 1008 is shown as pass.

Additional sensor data can be displayed in section 1010 in window 1002. This additional sensor data can include, for example, at least one of degradation, fuel density, temperature, capacitance or other suitable information.

With reference next to FIG. 11, an illustration of a test summary page is depicted in accordance with an illustrative embodiment. In this illustrative example, test summary page 1100 is displayed in graphical user interface 500. In this illustrative example, test summary page 1100 shows results for testing right tank 508 on both channels, Channel A and Channel B.

Figure 12:
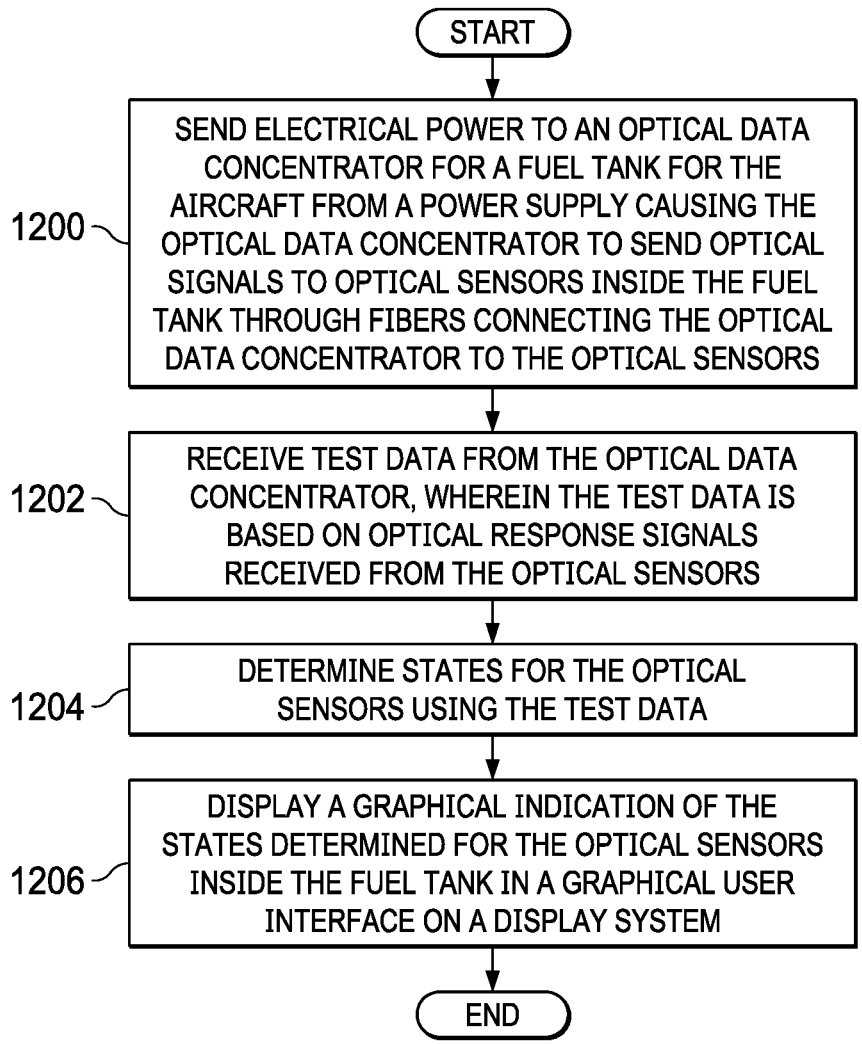
FIG. 12 is an illustration of a flowchart of a process for testing fuel tank for aircraft in accordance with an illustrative embodiment.

Turning next to FIG. 12, an illustration of a flowchart of a process for testing fuel tank for aircraft is depicted in accordance with an illustrative embodiment. The process in FIG. 12 can be implemented in hardware, software, or both. When implemented in software, the process can take the form of program code that is run by one of more processor units located in one or more hardware devices in one or more computer systems. For example, the process can be implemented in analyzer 244 in computer system 234 in FIG. 2.

The process begins by sending electrical power to an optical data concentrator for a fuel tank for the aircraft from a power supply causing the optical data concentrator sends optical signals to optical sensors inside the fuel tank through optical fibers connecting the optical data concentrator to the optical sensors (operation 1200). The electrical power is sent during a phase of manufacturing of the aircraft.

The process receives test data from the optical data concentrator, wherein the test data is based on optical response signals received from the optical sensors (operation 1202). The process determines states for the optical sensors using the test data (operation 1204)

The process displays a graphical indication of the states determined for the optical sensors inside the fuel tank in a graphical user interface on a display system (operation 1206). The process terminates thereafter.

Figure 13:
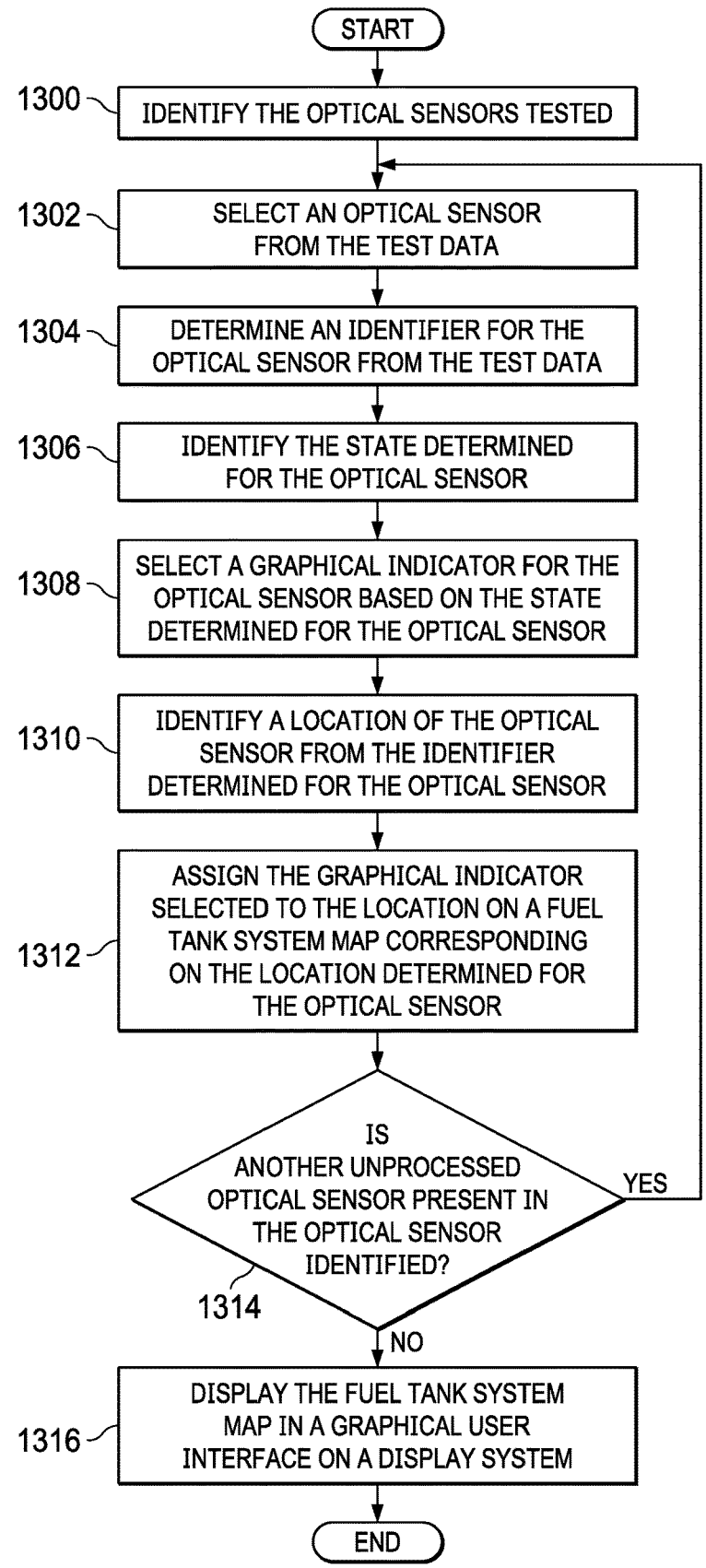
FIG. 13 is an illustration of a flowchart of a process for displaying a graphical indication of states of optical sensors in accordance with an illustrative embodiment.

With reference to FIG. 13, an illustration of a flowchart of a process for displaying a graphical indication of states of optical sensors is depicted in accordance with an illustrative embodiment. The process illustrated in FIG. 13 is an example of one implementation for operation 1206 in FIG. 12.

The process begins by identifying the optical sensors tested (operation 1300). These optical sensors are optical sensors which test data was received when electrical power was sent to a data concentrator. The process selects an optical sensor from the optical sensors tested for processing (operation 1302). The process determines an identifier for the optical sensor from the test data (operation 1304). In this example, the identifier can be unique identifier or some other identifier assigned to the optical sensor in the fuel tank.

The process identifies the state determined for the optical sensor (operation 1306). In operation 1306, the states can be selected from at least one of no data, fail, pass, or some other suitable state.

The process selects a graphical indicator for the optical sensor based on the state determined for the optical sensor (operation 1308). A graphical indicator can include at least one of an icon, a pictogram, an ideogram, a graphic, an image, text, animation, bolding, a line, an arrow, or other suitable graphic. For example, a circle with a color in which the color selected based on the state of the optical sensor can be used as the graphical indicator. In another illustrative example, different shapes such as a triangle, circle, a square, a diamond, or other shapes can be used based on the state of the optical sensor.

The process identifies a location of the optical sensor from the identifier determined for the optical sensor (operation 1310). This identifier for the optical sensor can be used to determine the location of the optical sensor in the fuel tank. For example, the optical sensors installed in the fuel tanks can have their installation locations recorded in a database, table, flat file, or other data structure.

The process assigns the graphical indicator selected to the location on a fuel tank system map corresponding on the location determined for the optical sensor (operation 1312). A determination is made as to whether another unprocessed optical sensor is present in the optical sensors identified (operation 1314). If another unprocessed optical sensor is present, the process returns to operation 1302.

Otherwise, the process displays the fuel tank system map in a graphical user interface on a display system (operation 1316). The process terminates thereafter.

Figure 14:
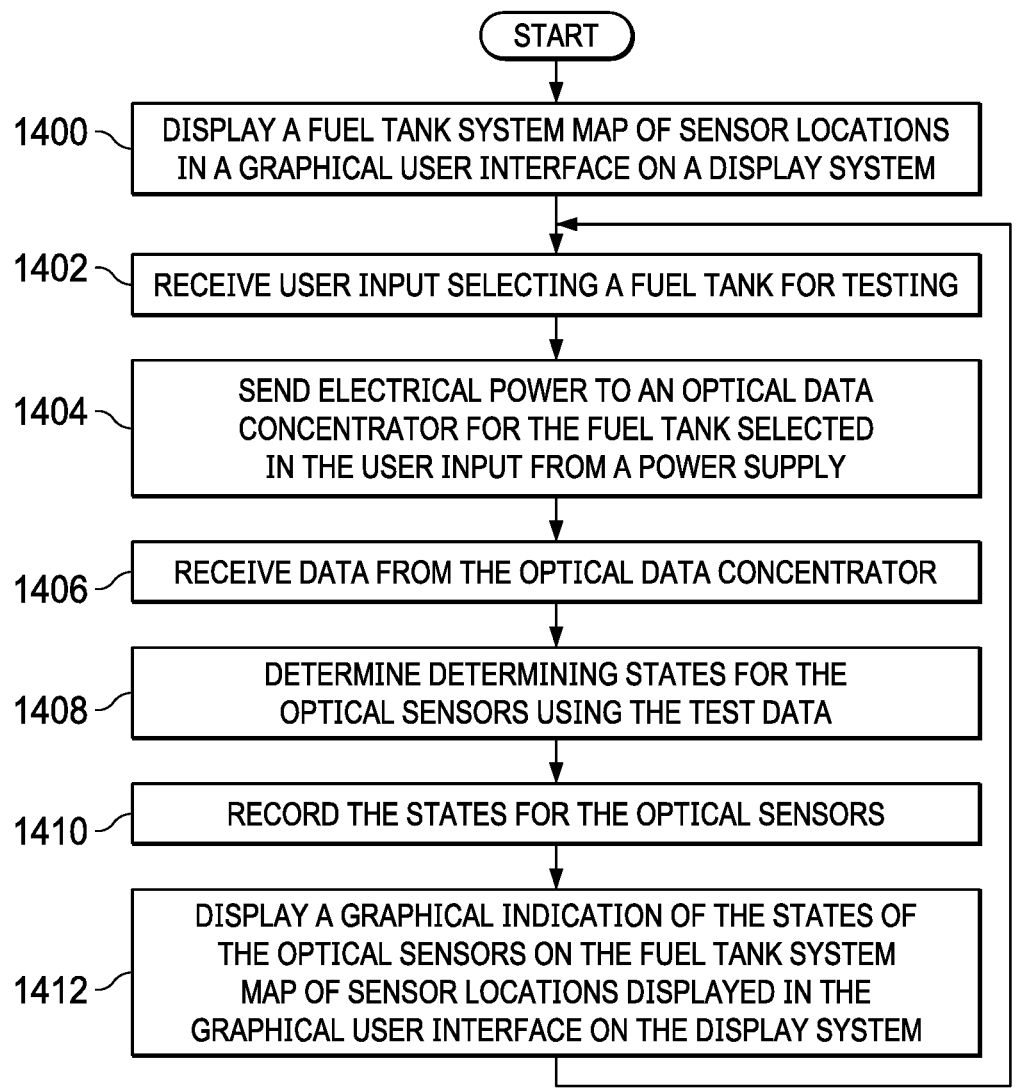
FIG. 14 is a more detailed illustration of a flowchart of a process for testing a fuel tank system for aircraft in accordance with an illustrative embodiment.

With reference next to FIG. 14, a more detailed illustration of a flowchart of a process for testing a fuel tank system for aircraft is depicted in accordance with an illustrative embodiment. The process in FIG. 14 can be implemented in hardware, software, or both. When implemented in software, the process can take the form of program code that is run by one of more processor units located in one or more hardware devices in one or more computer systems. For example, the process can be implemented in analyzer 244 in computer system 234 in FIG. 2.

The process begins by displaying a fuel tank system map of sensor locations in a graphical user interface on a display system (operation 1400). In this illustrative example, the fuel tank system map displays the different fuel tanks present in the fuel tank system. For example, the fuel tank system map may show a left-wing fuel tank, a center fuel tank, and a right wing fuel tank. The computer system and power supply are connected to the data concentrators for these different fuel tanks.

The process receives the user input selecting a fuel tank for testing (operation 1402). In this illustrative example, each fuel tank has an associated optical data concentrator and associated optical sensors in which the associated optical data concentrator and the associated optical sensors are connected to each other by associated optical fibers.

The process sending electrical power to an optical data concentrator for the fuel tank selected in the user input from a power supply (operation 1404). The electrical power powers the optical data concentrator such that the optical data concentrator sends optical signals to optical sensors inside the fuel tank through optical fibers connecting the optical data concentrator to the optical sensors.

The process receives data from the optical data concentrator (operation 1406). The process determines determining states for the optical sensors using the test data (operation 1408). The process records the states for the optical sensors (1410). In this illustrative example, the states can be recorded in a data structure such as a database, a table, a flat file, a linked list, or some other suitable type of data structure.

The process displays a graphical indication of the states of the optical sensors on the fuel tank system map of sensor locations displayed in the graphical user interface on the display system (operation 1412). The process then returns to operation 1402 to receive user input selecting a tank for testing.

Figure 15:
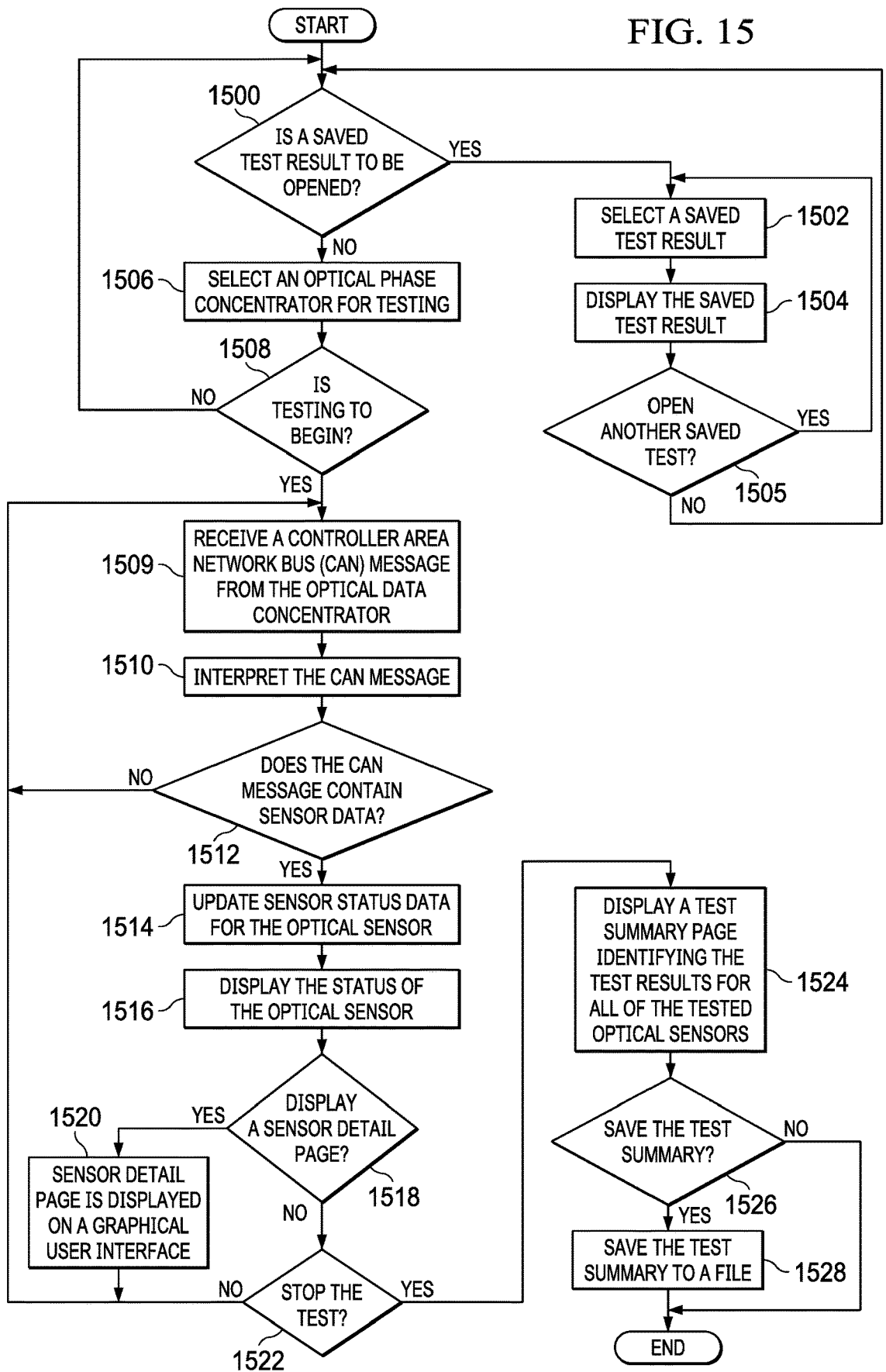
FIG. 15 is an illustration of a flowchart of a process for testing a fuel tank system for aircraft in accordance with an illustrative embodiment.

With reference next to FIG. 15, an illustration of a flowchart of a process for testing a fuel tank system for aircraft is depicted in accordance with an illustrative embodiment. The process in FIG. 14 can be implemented in hardware, software, or both. When implemented in software, the process can take the form of program code that is run by one of more processor units located in one or more hardware devices in one or more computer systems. For example, the process can be implemented in analyzer 244 in computer system 234 in FIG. 2. In this figure, the different determination operations are performed by the process utilizing user input received from a human operator. Further, the different selections in this process can also be made by user input.

The process begins by determining whether to open a saved test result (operation 1500). In operation 1500 files containing recorded test data from previous tests can also be opened as part of the saved test result. If a saved test result is to be opened, the process selects a saved test result (operation 1502). The process displays the saved test result (operation 1504). The process then determines whether to open another saved test (operation 1505). If another saved test is to be opened, the process returns to operation 1502. Otherwise, the process returns to operation 1500.

In operation 1500, if a saved test result is not to be opened, the process selects an optical phase concentrator for testing (operation 1506).

A determination is made as to whether to begin testing (operation 1508). In this example, user input can be received to begin the test which is used to make the determination in operation 1508. If testing is not to begin, the process returns to operation 1500.

With reference again to operation 1508, if testing is to begin, the process receives a controller area network bus (CAN) message from the optical data concentrator (operation 1509). The process interprets the CAN message (operation 1510). In this illustrative example, the interpretation performed in operation 1510 parses the identifier field of the CAN message to determine what type of data is in the message. If the data from the received CAN message is relevant it is used to determine the status of an optical sensor. For example, the process searches for optical sensor identifiers and the associated test data for those optical sensors. Additionally, timestamps for the test information can also be included.

The process determines whether the CAN message contains sensor data (operation 1512). This determination is made using the results of the interpretation in operation 1510. For example, each CAN message can include data about the state of a particular aspect of a sensor, such as the optical link, the sensor hardware state, the correct part, and other information. These different pieces of information received in the different CAN messages are used to determine the state of the optical sensor. For example, a CAN message can include a single bit that indicates whether an optical hardware failure has occurred. Another CAN message can include 16 bits of data that holds the part number for the optical sensor. The process looks for the identifiers indicating what type of data is received in the CAN messages. Once a message is detected with test data, the process determines if a pass or failure is present for a particular aspect for that instance. Once all of the test data is collected for an optical sensor, a pass/fail determination for the particular optical sensor is made using the different pieces of information received in the CAN messages from the optical data concentrator.

If the CAN message does not include sensor data, the process returns to operation 1508 to receive another CAN message. Otherwise, the process updates sensor status data for the optical sensor (operation 1514).

The process then displays the status of the optical sensor (operation 1516). In operation 1516, the display can be a window or other message displayed on a graphical user interface providing the status of the optical sensor. In one illustrative example, when a fuel tank system map is displayed, a graphical user interface for the optical sensor can be updated to indicate the current state of that optical sensor on the fuel tank system map.

The process determines whether to display a sensor detail page (operation 1518). Sensor detail page 1000 in FIG. 10 is an example of one mentation for the sensor detail page in operation 1518. If a sensor detail page is to be displayed, the sensor detail page is displayed on a graphical user interface (operation 1520). The process then returns to operation 1508 to receive another CAN message.

With reference again operation 1518, if the sensor detail pages not to be displayed, the process determines whether to stop the test (operation 1522). If the test is to be stopped, the process displays a test summary page identifying the test results for all of the tested optical sensors (operation 1524). Test summary page 1100 in FIG. 11 is an example of one rotation for the test summary page displayed in operation 1524

The process then determines whether to whether to save the test summary (operation 1526). If the test summary is to be saved, the process saves the test summary to a file (operation 1528). In the illustrative example, the test summary can be saved in a desired format such as a comma-separate values (CSV) file, which can be opened by a spreadsheet program. The process terminates thereafter.

With reference again to operation 1526, if the test summary is not to be saved, the process terminates. Turning back to operation 1522, if the test is not to be stopped, the process returns to operation 1509.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, in the process illustrated protesting fuel tanks in FIG. 14, more than one data concentrator can be present for a fuel tank. In this case, the selection can be made for a portion fuel tank as well as an entire fuel tank when testing optical sensors.

Figure 16:
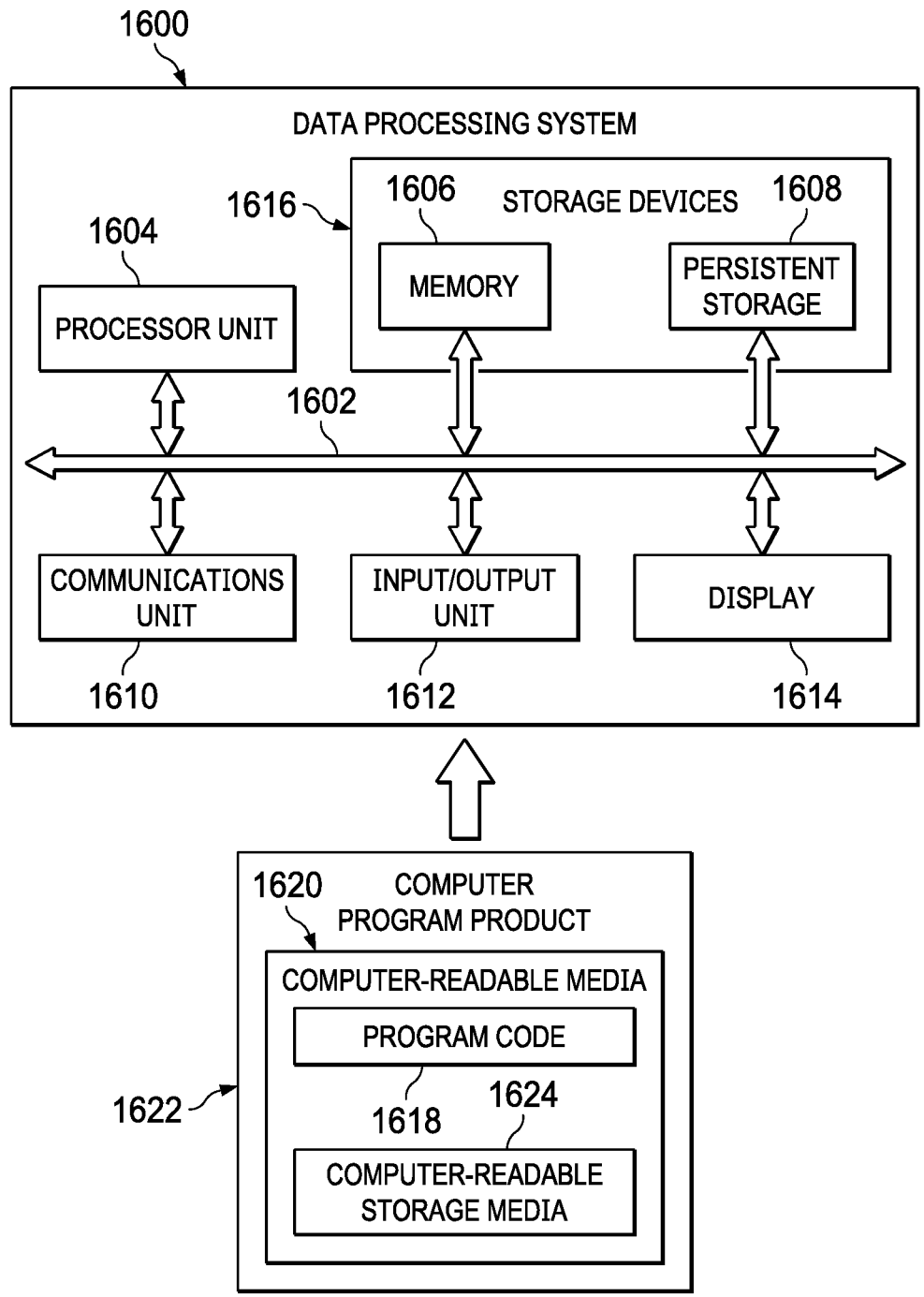
FIG. 16 is an illustration of a block diagram of a data processing system in accordance with an illustrative embodiment.

Turning now to FIG. 16, an illustration of a block diagram of a data processing system is depicted in accordance with an illustrative embodiment. Data processing system 1600 can be used to implement laptop computer 114 in FIG. 1 and computer system 234 in FIG. 2. In this illustrative example, data processing system 1600 includes communications framework 1602, which provides communications between processor unit 1604, memory 1606, persistent storage 1608, communications unit 1610, input/output (I/O) unit 1612, and display 1614. In this example, communications framework 1602 takes the form of a bus system.

Processor unit 1604 serves to execute instructions for software that can be loaded into memory 1606. Processor unit 1604 include one or more processors. For example, processor unit 1604 can be selected from at least one of a multicore processor, a central processing unit (CPU), a graphics processing unit (GPU), a physics processing unit (PPU), a digital signal processor (DSP), a network processor, or some other suitable type of processor.

Memory 1606 and persistent storage 1608 are examples of storage devices 1616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1616 may also be referred to as computer-readable storage devices in these illustrative examples. Memory 1606, in these examples, can be, for example, a random-access memory or any other suitable volatile or non-volatile storage device. Persistent storage 1608 may take various forms, depending on the particular implementation.

For example, persistent storage 1608 may contain one or more components or devices. For example, persistent storage 1608 can be a hard drive, a solid-state drive (SSD), a flash memory, a rewritable optical disk, a rewritable magnetic tape, or some combination of the above. The media used by persistent storage 1608 also can be removable. For example, a removable hard drive can be used for persistent storage 1608.

Communications unit 1610, in these illustrative examples, provides for communications with other data processing systems or devices. In these illustrative examples, communications unit 1610 is a network interface card.

Input/output unit 1612 allows for input and output of data with other devices that can be connected to data processing system 1600. For example, input/output unit 1612 may provide a connection for user input through at least one of a keyboard, a mouse, or some other suitable input device. Further, input/output unit 1612 may send output to a printer. Display 1614 provides a mechanism to display information to a user.

Instructions for at least one of the operating system, applications, or programs can be located in storage devices 1616, which are in communication with processor unit 1604 through communications framework 1602. The processes of the different embodiments can be performed by processor unit 1604 using computer-implemented instructions, which may be located in a memory, such as memory 1606.

These instructions are referred to as program code, computer usable program code, or computer-readable program code that can be read and executed by a processor in processor unit 1604. The program code in the different embodiments can be embodied on different physical or computer-readable storage media, such as memory 1606 or persistent storage 1608.

Program code 1618 is located in a functional form on computer-readable media 1620 that is selectively removable and can be loaded onto or transferred to data processing system 1600 for execution by processor unit 1604. Program code 1618 and computer-readable media 1620 form computer program product 1622 in these illustrative examples. In the illustrative example, computer-readable media 1620 is computer-readable storage media 1624.

In these illustrative examples, computer-readable storage media 1624 is a physical or tangible storage device used to store program code 1618 rather than a medium that propagates or transmits program code 1618.

Alternatively, program code 1618 can be transferred to data processing system 1600 using a computer-readable signal media. The computer-readable signal media can be, for example, a propagated data signal containing program code 1618. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1600 are not meant to provide architectural limitations to the manner in which different embodiments can be implemented. In some illustrative examples, one or more of the components may be incorporated in or otherwise form a portion of, another component. For example, the 1606, or portions thereof, may be incorporated in processor unit 1604 in some illustrative examples. The different illustrative embodiments can be implemented in a data processing system including components in addition to or in place of those illustrated for data processing system 1600. Other components shown in FIG. 16 can be varied from the illustrative examples shown. The different embodiments can be implemented using any hardware device or system capable of running program code 1618.

Figure 17:
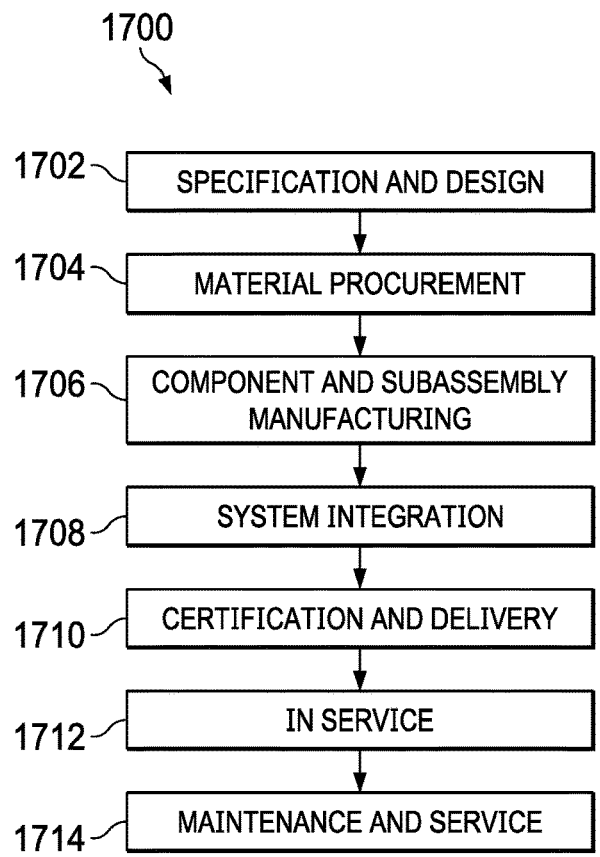
FIG. 17 is an illustration of an aircraft manufacturing and service method in accordance with an illustrative embodiment.
Figure 18:
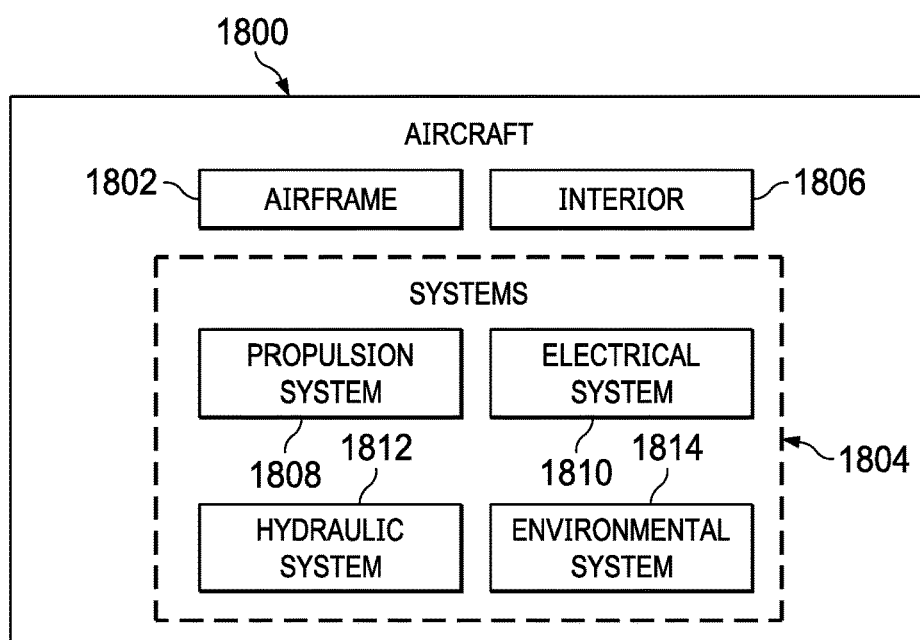
FIG. 18 is an illustration of a block diagram of an aircraft in which an illustrative embodiment may be implemented.

Illustrative embodiments of the disclosure may be described in the context of aircraft manufacturing and service method 1700 as shown in FIG. 17 and aircraft 1800 as shown in FIG. 18. Turning first to FIG. 17, an illustration of an aircraft manufacturing and service method is depicted in accordance with an illustrative embodiment. During preproduction, aircraft manufacturing and service method 1700 may include specification and design 1702 of aircraft 1800 in FIG. 18 and material procurement 1704.

During production, component and subassembly manufacturing 1706 and system integration 1708 of aircraft 1800 in FIG. 18 takes place. Thereafter, aircraft 1800 in FIG. 18 may go through certification and delivery 1710 in order to be placed in service 1712. While in service 1712 by a customer, aircraft 1800 in FIG. 18 is scheduled for routine maintenance and service 1714, which may include modification, reconfiguration, refurbishment, and other maintenance or service.

Each of the processes of aircraft manufacturing and service method 1700 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 18, an illustration a block diagram of an aircraft is depicted in which an illustrative embodiment may be implemented. In this example, aircraft 1800 is produced by aircraft manufacturing and service method 1700 in FIG. 17 and may include airframe 1802 with plurality of systems 1804 and interior 1806. Examples of systems 1804 include one or more of propulsion system 1808, electrical system 1810, hydraulic system 1812, and environmental system 1814. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1700 in FIG. 17.

In one illustrative example, components or subassemblies produced in component and subassembly manufacturing 1706 in FIG. 17 may be fabricated or manufactured in a manner similar to components or subassemblies produced while aircraft 1800 is in service 1712 in FIG. 17. As yet another example, one or more apparatus embodiments, method embodiments, or a combination thereof may be utilized during production stages, such as component and subassembly manufacturing 1706 and system integration 1708 in FIG. 17. One or more apparatus embodiments, method embodiments, or a combination thereof may be utilized while aircraft 1800 is in service 1712, during maintenance and service 1714 in FIG. 17, or both. The use of a number of the different illustrative embodiments may substantially expedite the assembly of aircraft 1800, reduce the cost of aircraft 1800, or both expedite the assembly of aircraft 1800 and reduce the cost of aircraft 1800.

Figure 19:
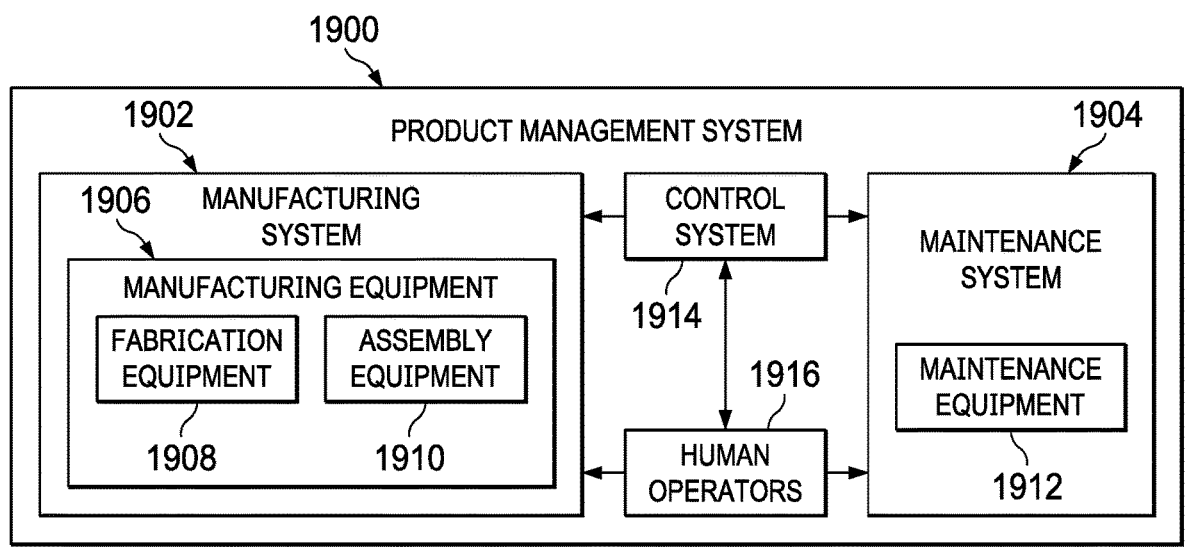
FIG. 19 is an illustration of a block diagram of a product management system in accordance with an illustrative embodiment.

Turning now to FIG. 19, an illustration of a block diagram of a product management system is depicted in accordance with an illustrative embodiment. Product management system 1900 is a physical hardware system. In this illustrative example, product management system 1900 may include at least one of manufacturing system 1902 or maintenance system 1904.

Manufacturing system 1902 is configured to manufacture products, such as aircraft 1800 in FIG. 18. As depicted, manufacturing system 1902 includes manufacturing equipment 1906. Manufacturing equipment 1906 includes at least one of fabrication equipment 1908 or assembly equipment 1910.

Fabrication equipment 1908 is equipment that may be used to fabricate components for parts used to form aircraft 1800 in FIG. 18. For example, fabrication equipment 1908 may include machines and tools. These machines and tools may be at least one of a drill, a hydraulic press, a furnace, a mold, a composite tape laying machine, a vacuum system, a lathe, or other suitable types of equipment. Fabrication equipment 1908 may be used to fabricate at least one of metal parts, composite parts, semiconductors, circuits, fasteners, ribs, skin panels, spars, antennas, or other suitable types of parts.

Assembly equipment 1910 is equipment used to assemble parts to form aircraft 1800 in FIG. 18. In particular, assembly equipment 1910 may be used to assemble components and parts to form aircraft 1800 in FIG. 18. Assembly equipment 1910 also may include machines and tools. These machines and tools may be at least one of a robotic arm, a crawler, a faster installation system, a rail-based drilling system, or a robot. Assembly equipment 1910 may be used to assemble parts such as seats, horizontal stabilizers, wings, engines, engine housings, landing gear systems, and other parts for aircraft 1800 in FIG. 18.

In this illustrative example, maintenance system 1904 includes maintenance equipment 1912. Maintenance equipment 1912 may include any equipment needed to perform maintenance on aircraft 1800 in FIG. 18. Maintenance equipment 1912 may include tools for performing different operations on parts on aircraft 1800 in FIG. 18. These operations may include at least one of disassembling parts, refurbishing parts, inspecting parts, reworking parts, manufacturing replacement parts, or other operations for performing maintenance on aircraft 1800 in FIG. 18. These operations may be for routine maintenance, inspections, upgrades, refurbishment, or other types of maintenance operations.

In the illustrative example, maintenance equipment 1912 may include ultrasonic inspection devices, x-ray imaging systems, vision systems, drills, crawlers, and other suitable device. In some cases, maintenance equipment 1912 may include fabrication equipment 1908, assembly equipment 1910, or both to produce and assemble parts that may be needed for maintenance.

Product management system 1900 also includes control system 1914. Control system 1914 is a hardware system and may also include software or other types of components. Control system 1914 is configured to control the operation of at least one of manufacturing system 1902 or maintenance system 1904. In particular, control system 1914 may control the operation of at least one of fabrication equipment 1908, assembly equipment 1910, or maintenance equipment 1912.

The hardware in control system 1914 may be implemented using hardware that may include computers, circuits, networks, and other types of equipment. The control may take the form of direct control of manufacturing equipment 1906. For example, robots, computer-controlled machines, and other equipment may be controlled by control system 1914. In other illustrative examples, control system 1914 may manage operations performed by human operators 1916 in manufacturing or performing maintenance on aircraft 1800. For example, control system 1914 may assign tasks, provide instructions, display models, or perform other operations to manage operations performed by human operators 1916.

In these illustrative examples, computer system 234 with analyzer 244 can be implemented in control system 1914 in which states of optical sensors in fuel tanks determined by analyzer 244 can be utilized to manage at least one of the manufacturing or maintenance of aircraft 1800 in FIG. 18. For example, an identification of nonconformances in the fuel tank can be displayed on a graphical user interface. Additionally, the identification of nonconformances based on the state of optical sensors can also be used by scheduling components in control system 1914 generate work orders used to manage operations performed by human operators 1916 to resolve nonconformances that may be detected.

In the different illustrative examples, human operators 1916 may operate or interact with at least one of manufacturing equipment 1906, maintenance equipment 1912, or control system 1914. This interaction may be performed to manufacture aircraft 1800 in FIG. 18.

Of course, product management system 1900 may be configured to manage other products other than aircraft 1800 in FIG. 18. Although product management system 1900 has been described with respect to manufacturing in the aerospace industry, product management system 1900 may be configured to manage products for other industries. For example, product management system 1900 can be configured to manufacture products for the automotive industry as well as any other suitable industries.

Thus, the illustrative embodiments provide a method, apparatus, and system for testing fuel tank systems for aircraft. In one illustrative example, electrical power is sent to an optical data concentrator for a fuel tank for the aircraft from a power supply such that the optical data concentrator sends optical signals to optical sensors inside the fuel tank through optical fibers connecting the optical data concentrator to the optical sensors. The electrical power is sent during a phase of manufacturing of the aircraft. Test data is received from the optical data concentrator by a computer system. The test data is based on optical response signals received from the optical sensors. A determination of states for the optical sensors is made by the computer system using the test data. A graphical indication of the states determined for the optical sensors inside the fuel tank is displayed by the computer system in a graphical user interface on a display system.

One or more illustrative examples provide a technical solution with a technical effect in which a fuel tank system analyzer can test a fuel tank in an aircraft structure prior to aircraft structure being connected avionics or other electrical aircraft systems. One or more illustrative examples provide a technical solution in which a technical effect reduces the time and effort needed to inspect, troubleshoot, and repair the nonconformances in a fuel tank by performing the testing at earlier ages of manufacturing as compared to current techniques. Further, these techniques can also be applied to testing fuel tanks in which maintenance such as routine maintenance, refurbishment, upgrades, or other is performed.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. As result, one or more illustrative examples can be used to test fuel tanks in a manner that reduces disruption to the manufacturing flow of an aircraft with respect to the time and effort needed to troubleshoot and resolve nonconformances.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for testing optical sensors inside a fuel tank for an aircraft at a phase of manufacturing, the method comprising:
sending electrical power to an optical data concentrator for the fuel tank in a fuel tank system for the aircraft from a power supply such that the optical data concentrator sends optical signals to the optical sensors in the fuel tank through optical fibers connecting the optical data concentrator to the optical sensors inside the fuel tank, wherein the optical sensors and the optical fibers are installed inside the fuel tank and wherein the electrical power is sent during the phase of manufacturing of the aircraft;

receiving, by a computer system in communication with the optical data concentrator, test data from the optical data concentrator, wherein the test data is based on optical response signals received from the optical sensors;

determining, by the computer system, states for the optical sensors using the test data, wherein each optical sensor of the optical sensors has a state of at least one of no data, fail, or pass; and displaying, by the computer system, a fuel tank system map of sensor locations of each optical sensor in the fuel tank, the state determined for each optical sensor of the optical sensors in the fuel tank, and an overall pass/fail display for the fuel tank in a graphical user interface on a display system;

wherein the optical signals sent by the optical data concentrator to the optical sensors is converted into electrical power by photovoltaic converters located within each optical sensor and used to power the optical sensors.

2. The method of claim 1, connecting the power supply to the optical data concentrator for the fuel tank in the fuel tank system, the optical data concentrator mounted on the fuel tank.

3. The method of claim 1 further comprising:
storing the states for the optical sensors in data structure.

4. The method of claim 1 further comprising:
receiving a selection of the fuel tank from fuel tanks for the aircraft, wherein each fuel tank of the fuel tanks has an associated optical data concentrator and associated optical sensors in which the associated optical data concentrator and the associated optical sensors are connected to each other by associated optical fibers, and wherein sending the electrical power to the optical data concentrator for the fuel tank in the fuel tank system for the aircraft from the power supply such that the optical data concentrator sends the optical signals to the optical sensors in the fuel tank through the optical fibers connecting the optical data concentrator to the optical sensors comprises:
responsive to selecting the fuel tank from the fuel tanks for the aircraft, sending the electrical power to the associated optical data concentrator for the fuel tank for the aircraft from the power supply such that the associated optical data concentrator sends the optical signals to the associated optical sensors inside the fuel tank through the associated optical fibers connecting the associated optical data concentrator to the associated optical sensors.

5. The method of claim 1 further comprising:
responsive to a group of the optical sensors having a number of nonconformances, performing, by a human operator, an action to resolve the number of nonconformances in the group of the optical sensors.

6. The method of claim 1, wherein each portion of the fuel tank system selectable for testing has an associated optical data concentrator.

7. The method of claim 1, wherein the aircraft is a partially assembled aircraft.

8. The method of claim 1, wherein the fuel tank is located in at least one of a wing of the aircraft or a fuselage section of the aircraft.

9. The method of claim 1, wherein computer system is selected from at least one of a server computer, a laptop computer, a desktop computer, a tablet computer, a mobile phone, or smart glasses.

10. A method for testing optical sensors inside a fuel tank for an aircraft, the method comprising:
sending electrical power to an optical data concentrator for the fuel tank for the aircraft from a power supply such that the optical data concentrator sends optical signals to the optical sensors inside the fuel tank through optical fibers connecting the optical data concentrator to the optical sensors, wherein the optical sensors and the optical fibers are installed inside the fuel tank and wherein the electrical power is sent during a phase of manufacturing of the aircraft, wherein the phase of manufacturing is prior to the fuel tank for the aircraft and the optical data concentrator being connected to avionics for the aircraft;

receiving, by a computer system in communication with the optical data concentrator, test data from the optical data concentrator, wherein the test data is based on optical response signals received from the optical sensors;

determining, by the computer system, states for the optical sensors using the test data, wherein each optical sensor of the optical sensors has a state of at least one of no data, fail, or pass; and displaying, by the computer system, a graphical indication of the state determined for each optical sensor of the optical sensors inside the fuel tank in a graphical user interface on a display system;

wherein the optical signals sent by the optical data concentrator to the optical sensors is converted into electrical power by photovoltaic converters located within each optical sensor and used to power the optical sensors.

11. The method of claim 10, wherein displaying, by the computer system, the graphical indication of the state determined for each optical sensor of the optical sensors in the fuel tank in the graphical user interface on the display system further comprises:
displaying, by the computer system, a fuel tank system map of sensor locations of each optical sensor in the fuel tank showing the state and location determined for each optical sensor of the optical sensors in the fuel tank in the graphical user interface on the display system.

12. The method of claim 10, wherein the sending electrical power is performed during at least one of during the phase of manufacturing or during maintenance.

13. The method of claim 10, wherein the fuel tank is located in a part selected from a group comprising a wing and a fuselage section.

14. The method of claim 10 further comprising:
storing the states for the optical sensors in data structure.

15. A fuel tank system analyzer comprising:
a power supply that operates to send electrical power to an optical data concentrator for a fuel tank in a fuel tank system for an aircraft such that the optical data concentrator sends optical signals to optical sensors installed inside the fuel tank through optical fibers installed inside the fuel tank, the optical fibers connecting the optical data concentrator to the optical sensors;
a computer system that operates to:

receive test data from the optical data concentrator when the computer system is in communication with the optical data concentrator in which the test data is based on optical response signals received from the optical sensors;

determine states for the optical sensors using the test data, wherein each optical sensor of the optical sensors has a state of at least one of no data, fail, or pass; and display a graphical indication of the location and the state determined for each optical sensor of the optical sensors in the fuel tank and an overall pass/fail display for the fuel tank in a graphical user interface on a display system; and wherein the optical signals sent by the optical data concentrator to the optical sensors is converted into electrical power by photovoltaic converters located within each optical sensor and used to power the optical sensors.

16. The fuel tank system analyzer of claim 15, wherein the computer system is in communication with the power supply and operates to control sending the electrical power to the optical data concentrator.

17. The fuel tank system analyzer of claim 15, wherein the computer system operates to receives a selection of the fuel tank from fuel tanks in the fuel tank system for the aircraft, wherein each fuel tank has an associated optical data concentrator and associated optical sensors in which the associated optical data concentrator and the associated optical sensors are connected to each other by associated optical fibers, and wherein in sending the electrical power to the optical data concentrator for the fuel tank in the fuel tank system for the aircraft from the power supply such that the optical data concentrator sends the optical signals to the optical sensors installed inside the fuel tank through the optical fibers installed inside the fuel tank connecting the optical data concentrator to the optical sensors, the computer system, responsive to selecting the fuel tank from the fuel tanks in the fuel tank system for the aircraft, operates to send the electrical power to the associated optical data concentrator for the fuel tank for the aircraft from the power supply such that the associated optical data concentrator sends the optical signals to the associated optical sensors in the fuel tank through the associated optical fibers connecting the associated optical data concentrator to the associated optical sensors.

18. The fuel tank system analyzer of claim 15, wherein in displaying the graphical indication of the states determined for each optical sensor of the optical sensors in the fuel tank in the graphical user interface on the display system, the computer system further operates to display a fuel tank system map of sensor locations showing the states determined for each optical sensor of the optical sensors in the fuel tank in the graphical user interface on the display system.

19. The fuel tank system analyzer of claim 15, wherein the computer system is selected from at least one of a server computer, a laptop computer, a desktop computer, a tablet computer, a mobile phone, or smart glasses.

20. The fuel tank system analyzer of claim 15, wherein the operation to send the electrical power is performed by the computer system during at least one of during a phase of manufacturing or during maintenance.

* * * * *